US011252554B2

(12) United States Patent
Liu et al.

(10) Patent No.: US 11,252,554 B2
(45) Date of Patent: Feb. 15, 2022

(54) USER EQUIPMENT TRACING METHOD AND DEVICE

(71) Applicant: HUAWEI TECHNOLOGIES CO., LTD., Guangdong (CN)

(72) Inventors: Jing Liu, Shanghai (CN); Hongzhuo Zhang, Shanghai (CN); Mingzeng Dai, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/826,640

(22) Filed: Mar. 23, 2020

(65) Prior Publication Data

US 2020/0221284 A1 Jul. 9, 2020

Related U.S. Application Data

(63) Continuation of application No. PCT/CN2018/106316, filed on Sep. 18, 2018.

(30) Foreign Application Priority Data

Sep. 25, 2017 (CN) .......................... 201710877135.X

(51) Int. Cl.
*H04W 8/08* (2009.01)
*H04W 76/11* (2018.01)
(Continued)

(52) U.S. Cl.
CPC ............. *H04W 8/08* (2013.01); *H04W 8/005* (2013.01); *H04W 8/24* (2013.01); *H04W 8/26* (2013.01);
(Continued)

(58) Field of Classification Search
CPC ......... H04W 8/08; H04W 8/005; H04W 8/24; H04W 8/26; H04W 88/06; H04W 76/15; H04W 76/11
(Continued)

(56) References Cited

U.S. PATENT DOCUMENTS 9,467,887 B2 * 10/2016 Feng ..................... H04W 24/10
2012/0252436 A1 10/2012 Strup et al.
(Continued)

FOREIGN PATENT DOCUMENTS

CN 101931858 A 12/2010
CN 104685911 A 6/2015
(Continued)

OTHER PUBLICATIONS

3GPP TS 32.422 V15.0.0 September (Year: 2017).*
(Continued)

*Primary Examiner* — William Nealon
(74) *Attorney, Agent, or Firm* — Fish & Richardson P.C.

(57) ABSTRACT

This application relates to the field of wireless communications technologies, and provides a user equipment tracing method and a device, to implement joint trace for user equipment by two devices. The user equipment tracing method includes: receiving, by a master base station, a request message sent by a core network device, where the request message requests the master base station to initiate trace for user equipment UE; and sending, by the master base station, a first message to a secondary base station, where the first message carries first instruction information, and the first instruction information instructs the secondary base station to trace the UE.

34 Claims, 8 Drawing Sheets

(51) Int. Cl.
*H04W 8/00* (2009.01)
*H04W 8/24* (2009.01)
*H04W 8/26* (2009.01)
*H04W 88/06* (2009.01)
*H04W 76/15* (2018.01)

(52) U.S. Cl.
CPC ............ *H04W 76/11* (2018.02); *H04W 76/15* (2018.02); *H04W 88/06* (2013.01)

(58) Field of Classification Search
USPC .......................................................... 370/331
See application file for complete search history.

(56) References Cited

U.S. PATENT DOCUMENTS

| | | | | |
|---|---|---|---|---|
| 2015/0109939 | A1* | 4/2015 | Schmidt | H04W 24/08 370/252 |
| 2016/0094722 | A1 | 3/2016 | Sharma | |
| 2016/0255525 | A1* | 9/2016 | Li | H04W 24/08 370/252 |
| 2017/0208491 | A1* | 7/2017 | Xu | H04W 24/10 |
| 2018/0279168 | A1* | 9/2018 | Jheng | H04W 28/04 |

FOREIGN PATENT DOCUMENTS

| | | |
|---|---|---|
| CN | 104796865 A | 7/2015 |
| CN | 104995973 A | 10/2015 |
| CN | 105025465 A | 11/2015 |
| CN | 105657820 A | 6/2016 |
| CN | 106817777 A | 6/2017 |
| CN | 106900031 A | 6/2017 |
| EP | 2127429 B1 | 5/2015 |
| EP | 3057354 A1 | 8/2016 |
| WO | 2016012053 A1 | 1/2016 |

OTHER PUBLICATIONS

3GPP TS 32.422 V15.0.0 (Sep. 2017), "3rd Generation Partnership Project;Technical Specification Group Services and System Aspects; Telecommunication management; Subscriber and equipment trace; Trace control and configuration management (Release 15)," Sep. 2017, 151 pages.

Extended European Search Report issued in European Application No. 18859698.5 dated Sep. 29, 2020, 8 pages.

3GPP TS 36.423 V14.3.0, "3rd Generation Partnership Project;Technical Specification Group Radio Access Network; Evolved Universal Terrestrial Radio Access Network (E-UTRAN); X2 application protocol (X2AP) (Release 14)," Jun. 2017, 242 pages.

3GPP TS 36.413 V14.3.0 (Jun. 2017), "3rd Generation Partnership Project; Technical Specification Group Radio Access Network; Evolved Universal Terrestrial Radio Access Network (E-UTRAN); S1 Application Protocol (S1AP) (Release 14)," Jun. 2017, 347 pages.

Huawei, "Introduction of NB-IoT", 3GPP TSG-RAN WG2 NB-IOT Adhoc Meeting, R2-160429, Budapest, Hungary, Jan. 19-21, 2016, 288 pages.

Office Action issued in Chinese Application No. 201710877135.X dated Mar. 30, 2020, 22 pages (with English translation).

PCT International Search Report and Written Opinion issued in International Application No. PCT/CN2018/106316 dated Dec. 3, 2018, 13 pages (with English translation).

NTT Docomo, Inc., "Status Report to TSG," 3GPP TSG RAN meeting #76, RP-1711505, West Palm Beach, USA, Jun. 5-8, 2017, 218 pages.

Office Action issued in Chinese Application No. 201710877135.X dated Dec. 14, 2021, 7 pages (with English translation).

Xu et al., "Forecast-Based Nodes Collaborative Scheduling Algorithm for Moving Target Fracking," Computer Applications and Software, vol. 32, No. 12, Dec. 2015, 4 pages (with English abstract).

EPO Communication pursuant to Article 94(3) EPC issued in European Application No. 18859698.5 dated Nov. 2, 2021, 6 pages.

Nokia et al., "Trace support in NGAP," 3GPP TSG-RAN WG3 Meeting #99bis, R3-181824, Sanya, China, Apr. 16-20, 2018, 15 pages.

* cited by examiner

USER EQUIPMENT TRACING METHOD AND DEVICE

CROSS-REFERENCE TO RELATED APPLICATIONS

This application is a continuation of International Application No. PCT/CN2018/106316, filed on Sep. 18, 2018, which claims priority to Chinese Patent Application No. 201710877135.X, filed on Sep. 25, 2017. The disclosures of the aforementioned applications are hereby incorporated herein by reference in their entireties.

TECHNICAL FIELD

Embodiments of this application relate to the field of wireless communications technologies, and in particular, to a user equipment tracing method and a device.

BACKGROUND in an existing long term evolution (LTE) mechanism, an eNodeB (eNB) can support end-to-end trace for user equipment (UE), to help, based on a trace result for the UE that is fed back by the eNodeB, a network entity (for example, an operation, administration and maintenance (OAM) server) trace/monitor a service status/service performance of the UE on the eNodeB, find an exception in time, and locate a network fault and problem quickly, thereby facilitating device maintenance and fault removal.

In the conventional technical solution, how an eNodeB activates trace for UE in the LTE system only in several scenarios is described. For example, in a scenario in which UE initially accesses a network, an eNB receives a trace activation instruction sent by a core network device (for example, a mobility management entity (MME)) by using an Initial Context Setup Response message, and triggers trace for the UE according to the trace activation instruction. For another example, after UE accesses a network, an eNB activates trace for the UE according to a trace activation instruction added by an MME to a Trace Start message. In an existing standard, there is a dual connectivity (DC) scenario, to be specific, a scenario in which one UE is simultaneously connected to two base stations. One of the two base stations serves as a master base station, the other serves as a secondary base station, and there is a signaling connection only between the master base station and a core network device.

However, currently, there is no solution for tracing user equipment by a secondary base stations in the DC scenario.

SUMMARY

This application provides a user equipment tracing method and a device, to implement joint trace for user equipment by a master base station and a secondary base station.

According to a first aspect, an embodiment of the present disclosure provides a user equipment tracing method, including: receiving, by a master base station, a request message sent by a core network device, where the request message is used to request the master base station to initiate trace for user equipment; starting, by the master base station based on the request message, tracing the user equipment UE; and sending, by the master base station to a secondary base station, a first message carrying first instruction information, where the first instruction information is used to instruct the secondary base station to trace the UE. In this application, a centralized unit (CU)—distributed unit (DU) architecture may alternatively be used for the secondary base station. In this way, the master base station sends, to a CU in the secondary base station, the first message carrying the first instruction information, and the CU in the secondary base station traces the UE according to the first instruction information. Optionally, the CU in the secondary base station may further send the first instruction information to a DU through an FT interface, so that the DU in the secondary base station also starts tracing the user equipment.

Because in a conventional technical solution, a secondary base station usually has no parameter for tracing user equipment, the secondary base station cannot start tracing the user equipment. In this application, the master base station receives the request message sent by the core network device, and sends the first message to the secondary base station when starting, based on the request message, tracing the user equipment, to send, to the secondary base station, the first instruction information for tracing the user equipment, thereby triggering the secondary base station to trace the user equipment. In this way, the secondary base station and the master base station can jointly trace the user equipment.

With reference to the first aspect, in a first possible implementation of the first aspect, the first message is a secondary base station addition request message, or the first message is a secondary base station modification request message. To be specific, if dual connectivity has not been established for the user equipment when the master base station triggers the secondary base station to start tracing the user equipment, the master base station adds the first instruction information to the secondary base station addition request message, to trigger the secondary base station to start tracing the user equipment. If dual connectivity has been established for the user equipment when the master base station triggers the secondary base station to start tracing the user equipment, the master base station adds the first instruction information to the secondary base station modification request message, to trigger the secondary base station to start tracing the user equipment. In this way, an existing message may be extended to carry the first instruction information, thereby avoiding newly defining a message. Optionally, in addition to the secondary base station addition request message and the secondary base station modification request message, the master base station may alternatively add the first instruction information to a newly defined message, to trigger the secondary base station to start tracing the user equipment.

With reference to the first aspect or the first possible implementation of the first aspect, in a second possible implementation of the first aspect, the first instruction information includes at least one of the following information: a trace identifier, where the trace identifier is used to identify a trace task to be started for the user equipment; an interface-to-trace indication, used to instruct to trace the user equipment on a specified interface; a trace depth indication; a trace collection entity IP address; or configuration information for minimization of drive tests. The secondary base station traces the user equipment according to the received first instruction information.

With reference to any one of the first aspect or the first or the second possible implementation of the first aspect, in a third possible implementation of the first aspect, the specified interface includes at least one of the following: an S1 interface, an X2 interface, a Uu interface, an Xn interface, an NG interface, or an F1 interface. In this way, the secondary base station can determine an interface on which trace for user equipment needs to be started.

With reference to any one of the first aspect or the first to the third possible implementations of the first aspect, in a fourth possible implementation of the first aspect, before the sending, by the master base station, a first message to a secondary base station, the method provided in this application further includes: receiving, by the master base station, trace activation instruction information sent by the core network device, where the trace activation instruction information is used to instruct the master base station to start tracing the UE. In this way, the master base station can trace the user equipment according to the instruction of the core network device.

With reference to any one of the first aspect or the first to the fourth possible implementations of the first aspect, in a fifth possible implementation of the first aspect, the trace activation instruction information includes an instruction for starting, on the Xn interface and/or the NG interface and/or the F1 interface, tracing the UE. In this case, the master base station may instruct, according to the instruction that is configured by the core network device and that is for starting, on the Xn interface and/or the NG interface and/or the F1 interface, tracing the UE, the secondary base station to trace the UE on the Xn interface and/or the NG interface and/or the F1 interface.

With reference to any one of the first aspect or the first to the fifth possible implementations of the first aspect, in a sixth possible implementation of the first aspect, before the sending, by the master base station, a first message to a secondary base station, the method provided in this application further includes: receiving, by the master base station, fourth indication information sent by the secondary base station, where the fourth indication information is used to query whether the secondary base station needs to start tracing the UE. The secondary base station sends the fourth indication information to the master base station. In this way, when the secondary base station does not receive the instruction for starting tracing the user equipment that is sent by the master base station, the secondary base station can actively query whether the master base station needs to trigger the secondary base station to trace the UE.

With reference to any one of the first aspect or the first to the sixth possible implementations of the first aspect, in a seventh possible implementation of the first aspect, the method provided in this application further includes: sending, by the master base station to the secondary base station, a second message carrying second instruction information, where the second instruction information is used to instruct the secondary base station to deactivate (stop) the trace for the UE. In this case, the master base station may trigger, when determining that the core network device triggers the master base station to deactivate the trace for the UE, the secondary base station to deactivate the trace for the UE. Alternatively, the master base station may self-determine to trigger the secondary base station to deactivate the trace for the UE.

With reference to any one of the first aspect or the first to the seventh possible implementations of the first aspect, in an eighth possible implementation of the first aspect, the second message is a secondary base station modification request message. Certainly, the second message may alternatively be a newly defined message. When the second message is a secondary base station modification request message, an existing secondary base station modification request message is extended (for example, a field is newly added to the existing secondary base station modification request message to indicate the second instruction information to trigger the secondary base station to deactivate the trace for the UE, thereby avoiding redefining a message by the master base station and the secondary base station.

With reference to any one of the first aspect or the first to the eighth possible implementations of the first aspect, in a ninth possible implementation of the first aspect, the second instruction information includes at least one of a trace identifier corresponding to the trace deactivation and a deactivation cause. In this way, the secondary base station can deactivate the trace for the user equipment according to the received second instruction information, and determine a cause of the trace deactivation based on the deactivation cause.

With reference to any one of the first aspect or the first to the ninth possible implementations of the first aspect, in a tenth possible implementation of the first aspect, the method provided in this application further includes: receiving, by the master base station, a third message that is sent by the secondary base station and that carries third indication information, where the third indication information is used to indicate that the secondary base station fails to start tracing the UE. In this way, the master base station can perform, based on the received third indication information, subsequent processing such as feeding back a trace failure of the secondary base station to a network entity, or re-triggering, after a period of time, the secondary base station to start tracing the user equipment.

With reference to any one of the first aspect or the first to the tenth possible implementations of the first aspect, in an eleventh possible implementation of the first aspect, the third message is a secondary base station modification request acknowledgment message. Certainly, the third message may alternatively be a newly defined message. When the third message is a secondary base station modification request acknowledgment message, a field is newly added to an existing secondary base station modification request acknowledgment message to carry the third indication information, to avoid redefining a message.

With reference to any one of the first aspect or the first to the eleventh possible implementations of the first aspect, in a twelfth possible implementation of the first aspect, the third indication information includes at least one of a trace identifier corresponding to the trace start failure and a trace start failure cause. At least one of the trace identifier corresponding to the trace failure and the trace failure cause (for example, that the UE changes the secondary base station) is sent to the master base station, so that the master base station can determine, based on the trace identifier, that the secondary base station fails to trace a task indicated by the trace identifier, and determine a cause of the start failure based on the trace failure cause, to facilitate subsequent retrace for the UE.

With reference to any one of the first aspect or the first to the twelfth possible implementations of the first aspect, in a thirteenth possible implementation of the first aspect, the method provided in this application further includes: receiving, by the master base station, a trace result for the UE that is sent by the secondary base station; and sending, by the master base station to a target server, a fourth message including at least one of the trace result of the secondary base station for the UE and a trace result of the master base station for the UE. The master base station feeds back the trace results to the target server, so that the target server can perform centralized analysis on the fed back trace results.

With reference to any one of the first aspect or the first to the thirteenth possible implementations of the first aspect, in a fourteenth possible implementation of the first aspect, the fourth message further includes indication information used to indicate a device corresponding to the trace result for the UE, to help the target server distinguish whether a received feedback result is obtained through trace by the master base station or by the secondary base station.

According to a second aspect, an embodiment of the present disclosure provides a user equipment tracing method, including: receiving, by a secondary base station, a first message that is sent by a master base station and that carries first instruction information, where the first instruction information is used to instruct the secondary base station to trace UE; and tracing, by the secondary base station, the UE according to the first instruction information.

With reference to the second aspect, in a first possible implementation of the second aspect, the first message is a secondary base station addition request message, or the first message is a secondary base station modification request message.

With reference to the second aspect or the first possible implementation of the second aspect, in a second possible implementation of the second aspect, the first instruction information includes at least one of the following information: a trace identifier; an interface-to-trace indication, used to instruct to trace the user equipment on a specified interface; a trace depth indication; a trace collection entity IP address; or configuration information for minimization of drive tests.

With reference to any one of the second aspect or the first or the second possible implementation of the second aspect, in a third possible implementation of the second aspect, the specified interface includes at least one of the following: an S1 interface, an X2 interface, a Uu interface, an Xn interface, an NG interface, or an F1 interface.

With reference to any one of the second aspect or the first to the third possible implementations of the second aspect, in a fourth possible implementation of the second aspect, before the receiving, by a secondary base station, a first message sent by a master base station, the method provided in this application further includes: sending, by the secondary base station, fourth indication information to the master base station, where the fourth indication information is used to query whether the secondary base station needs to trace the UE.

With reference to any one of the second aspect or the first to the fourth possible implementations of the second aspect, in a fifth possible implementation of the second aspect, the method provided in this application further includes: receiving, by the secondary base station, a second message that is sent by the master base station and that carries second instruction information, where the second instruction information is used to instruct the secondary base station to deactivate the trace for the UE.

With reference to any one of the second aspect or the first to the fifth possible implementations of the second aspect, in a sixth possible implementation of the second aspect, the second message is a secondary base station modification request message.

With reference to any one of the second aspect or the first to the sixth possible implementations of the second aspect, in a seventh possible implementation of the second aspect, the second instruction information includes at least one of a trace identifier corresponding to the trace deactivation and a deactivation cause.

With reference to any one of the second aspect or the first to the seventh possible implementations of the second aspect, in an eighth possible implementation of the second aspect, the method provided in this application further includes: sending, by the secondary base station, a third message carrying third indication information to the master base station, where the third indication information is used to indicate that the secondary base station fails to start tracing the UE.

With reference to any one of the second aspect or the first to the eighth possible implementations of the second aspect, in a ninth possible implementation of the second aspect, the third message is a secondary base station modification request acknowledgment message.

With reference to any one of the second aspect or the first to the ninth possible implementations of the second aspect, in a tenth possible implementation of the second aspect, the third indication information includes at least one of a trace identifier corresponding to the trace failure and a trace failure cause.

With reference to any one of the second aspect or the first to the tenth possible implementations of the second aspect, in an eleventh possible implementation of the second aspect, the method provided in this application further includes: sending, by the secondary base station, a trace result for the UE to the master base station.

According to a third aspect, this application further provides a user equipment tracing apparatus, and the user equipment tracing apparatus can implement the user equipment tracing method according to any one of the first aspect or the possible implementations of the first aspect. For example, the user equipment tracing apparatus may be a master base station, or a chip disposed in a master base station. The user equipment tracing apparatus may implement the foregoing method by software, hardware, or hardware by executing corresponding software.

In a possible design, the user equipment tracing apparatus may include a processor and a memory. The processor is configured to support the user equipment tracing apparatus in performing a corresponding function in the method according to any one of the first aspect or the possible implementations of the first aspect. The memory is configured to couple to the processor and stores a program (instruction) and data that are necessary for the apparatus. In addition, the apparatus may further include a communications interface, configured to support communication between the user equipment tracing apparatus and another network element. The communications interface may be a transmitter and a receiver, and the transmitter and the receiver may be referred to as a transceiver together.

In a possible implementation, the master base station includes: a receiver, configured to receive a request message sent by a core network device, where the request message is used to request the master base station to initiate trace for user equipment UE; a processor, configured to start tracing the user equipment; and a transmitter, configured to send a first message to a secondary base station, where the first message carries first instruction information, and the first instruction information is used to instruct the secondary base station to trace the UE.

In a possible design, the first instruction information includes at least one of the following information: a trace identifier; an interface-to-trace indication, used to instruct to trace the user equipment on a specified interface; a trace depth indication; a trace collection entity IP address; or configuration information for minimization of drive tests.

In a possible design, the specified interface includes at least one of the following: an S1 interface, an X2 interface, a Uu interface, an Xn interface, an NG interface, or an F1 interface.

In a possible design, the transmitter is further configured to send a second message to the secondary base station, where the second message carries second instruction information, and the second instruction information is used to instruct the secondary base station to deactivate the trace for the UE.

In a possible design, the second instruction information includes at least one of a trace identifier corresponding to the trace deactivation and a deactivation cause.

In a possible design, the receiver is further configured to receive a third message sent by the secondary base station, where the third message carries third indication information, and the third indication information is used to indicate that the secondary base station fails to start tracing the UE.

In a possible design, the receiver is further configured to receive a trace result for the UE that is sent by the secondary base station; and the transmitter is further configured to send a fourth message to a target server, where the fourth message includes at least one of the trace result of the secondary base station for the UE and a trace result of the master base station for the UE.

In another possible implementation, the user equipment tracing apparatus may include: a receiving unit, a processing unit, and a sending unit. The receiving unit is configured to receive a request message sent by a core network device, where the request message is used to request the user equipment tracing apparatus to initiate trace for user equipment UE. The processing unit is configured to initiate the trace for the user equipment UE. The sending unit is configured to send a first message carrying first instruction information to a secondary base station, where the first instruction information is used to instruct the secondary base station to trace the UE.

In a possible design, the first message is a secondary base station addition request message, or the first message is a secondary base station modification request message.

In a possible design, the first instruction information includes at least one of the following information: a trace identifier, where the trace identifier is used to identify a trace task for the user equipment; an interface-to-trace indication, used to instruct to trace the user equipment on a specified interface; a trace depth indication; a trace collection entity IP address; or configuration information for minimization of drive tests.

In a possible design, the specified interface includes at least one of the following: an S1 interface, an X2 interface, a Uu interface, an Xn interface, an NG interface, or an F1 interface.

In a possible design, the apparatus provided in this application may further include: the receiving unit, further configured to receive trace activation instruction information sent by the core network device, where the trace activation instruction information is used to instruct the master base station to start tracing the UE.

In a possible design, the trace activation instruction information includes an instruction for starting, on at least one of the Xn interface, the NG interface, or the F1 interface, tracing the UE.

In a possible design, the receiving unit is further configured to receive fourth indication information sent by the secondary base station, where the fourth indication information is used to query whether the secondary base station traces the UE.

In a possible design, the sending unit provided in this application is further configured to send a second message carrying second instruction information to the secondary base station, where the second instruction information is used to instruct the secondary base station to deactivate the trace for the UE.

In a possible design, the second message is a secondary base station modification request message.

In a possible design, the second instruction information includes at least one of a trace identifier corresponding to the trace deactivation and a deactivation cause.

In a possible design, the receiving unit is further configured to receive a third message that is sent by the secondary base station and that carries third indication information, where the third indication information is used to indicate that the secondary base station fails to start tracing the UE.

In a possible design, the third message is a secondary base station modification request acknowledgment message.

In a possible design, the third indication information includes at least one of a trace identifier corresponding to the trace failure and a trace failure cause.

In a possible design, the receiving unit provided in this application is further configured to receive a trace result for the UE that is sent by the secondary base station; and the sending unit is further configured to send, to a target server, a fourth message including at least one of the trace result of the secondary base station for the UE and a trace result of the master base station for the UE.

In a possible design, the fourth message further includes indication information used to indicate a device corresponding to the trace result for the UE, to help the target server distinguish whether a received feedback result is obtained through trace by the master base station or by the secondary base station.

According to a fourth aspect, an embodiment of the present disclosure provides a user equipment tracing apparatus, and the user equipment tracing apparatus can implement the user equipment tracing method according to any one of the second aspect or the possible implementations of the second aspect. For example, the user equipment tracing apparatus may be a secondary base station, or a chip disposed in a secondary base station. The user equipment tracing apparatus may implement the foregoing method by software, hardware, or hardware by executing corresponding software.

In a possible design, the user equipment tracing apparatus may include a processor and a memory. The processor is configured to support the user equipment tracing apparatus in performing a corresponding function in the method according to any one of the second aspect or the possible implementations of the second aspect. The memory is configured to couple to the processor and stores a program (instruction) and data that are necessary for the apparatus. In addition, the apparatus may further include a communications interface, configured to support communication between the user equipment tracing apparatus and another network element. The communications interface may be a transmitter and a receiver, and the transmitter and the receiver may be referred to as a transceiver together.

In a possible implementation, an embodiment of this application provides a secondary base station, including: a receiver, configured to receive a first message sent by a master base station, where the first message carries first instruction information, and the first instruction information is used to instruct the secondary base station to trace UE; and a processor, configured to trace the UE according to the first instruction information.

In a possible design, the first instruction information includes at least one of the following information: a trace identifier; an interface-to-trace indication, used to instruct to trace the user equipment on a specified interface; a trace depth indication; a trace collection entity IP address; or configuration information for minimization of drive tests.

In a possible design, the specified interface includes at least one of the following: an S1 interface, an X2 interface, a Uu interface, an Xn interface, an NG interface, or an F1 interface.

In a possible design, the receiver is further configured to receive a second message sent by the master base station, where the second message carries second instruction information, and the second instruction information is used to instruct the secondary base station to deactivate the trace for the UE.

In a possible design, the second instruction information includes at least one of a trace identifier corresponding to the trace deactivation and a deactivation cause.

In a possible design, the secondary base station further includes a transmitter, configured to send a third message to the master base station, where the third message carries third indication information, and the third indication information is used to indicate that the secondary base station fails to start tracing the UE.

In a possible design, the transmitter is further configured to send a trace result for the UE to the master base station.

In a possible design, the user equipment tracing apparatus may include a receiving unit and a processing unit. The receiving unit is configured to receive a first message that is sent by a master base station and that carries first instruction information, where the first instruction information is used to instruct the secondary base station to start tracing UE. The processing unit is configured to start, according to the first instruction information, tracing the UE.

In a possible design, the first message is a secondary base station addition request message, or the first message is a secondary base station modification request message.

In a possible design, the first instruction information includes at least one of the following information: a trace identifier; an interface-to-trace indication, used to indicate a specified interface on which the trace for a user equipment is to be started; a trace depth indication; a trace collection entity IP address; or configuration information for minimization of drive tests.

In a possible design, the specified interface includes at least one of the following: an S1 interface, an X2 interface, a Uu interface, an Xn interface, an NG interface, or an F1 interface.

In another possible implementation, the apparatus provided in this application further includes a sending unit, configured to send fourth indication information to the master base station, where the fourth indication information is used to query whether the secondary base station needs to start tracing the UE.

In a possible design, the receiving unit provided in this application is further configured to receive a second message that is sent by the master base station and that carries second instruction information, where the second instruction information is used to instruct the secondary base station to deactivate the trace for the UE.

In a possible design, the second message is a secondary base station modification request message.

In a possible design, the second instruction information includes at least one of a trace identifier corresponding to the trace deactivation and a deactivation cause.

In a possible design, the sending unit is further configured to send a third message carrying third indication information to the master base station, where the third indication information is used to indicate that the secondary base station fails to start tracing the UE.

In a possible design, the third message is a secondary base station modification request acknowledgment message.

In a possible design, the third indication information includes at least one of a trace identifier corresponding to the trace start failure and a trace start failure cause.

In a possible design, the sending unit is further configured to send a trace result for the UE to the master base station.

According to a fifth aspect, an embodiment of the present disclosure provides a user equipment tracing method, including: receiving, by a CU, a request message sent by a core network device or a master base station, where the request message is used to request the CU to initiate trace for user equipment; starting, by the CU based on the request message, tracing the user equipment UE; and sending, by the CU, a first message carrying first instruction information to a DU (the CU may send the first instruction information through an F1 interface between the CU and the DU), where the first instruction information is used to instruct the DU to trace the UE.

According to the user equipment tracing method provided in this application, a future access network may be implemented by using a cloud radio access network (C-RAN) architecture. In this case, a protocol stack architecture and function of a conventional base station (for example, a secondary base station in a DC scenario) are divided into two parts, one part is referred to as a CU, the other part is referred to as a DU, and usually, the CU may be connected to the core network device. Therefore, the CU may be triggered by the core network device (for example, a core network control plane entity) to start tracing user equipment. Because there is no interface between the DU and the core network control plane entity, the DU usually has no parameter for tracing the user equipment, and therefore cannot start tracing the user equipment. In this application, when starting tracing the user equipment, the CU sends the first message carrying the first instruction information to the DU, to send, to the DU, the first instruction information for tracing the user equipment, thereby triggering the DU to trace the user equipment. In this way, the DU and the CU can jointly trace the user equipment.

With reference to the fifth aspect, in a first possible implementation of the fifth aspect, the first instruction information includes at least one of the following information: a trace identifier, where the trace identifier is used to identify a trace task for the user equipment; an interface-to-trace indication, used to instruct to trace the user equipment on a specified interface; a trace depth indication; a trace collection entity IP address; or configuration information for minimization of drive tests.

With reference to the fifth aspect or the first possible implementation of the fifth aspect, in a second possible implementation of the fifth aspect, the specified interface includes at least one of the following: an S1 interface, an X2 interface, a Uu interface, an Xn interface, an NG interface, or an F1 interface. In this way, the DU can determine to trace the UE on the F1 interface.

With reference to any one of the fifth aspect or the first or the second possible implementation of the fifth aspect, in a third possible implementation of the fifth aspect, before the sending, by the CU, a first message to the DU, the method provided in this application further includes: receiving, by the CU, trace activation instruction information sent by the master base station or the core network control plane entity (for example, a mobility management entity (MME)), where the trace activation instruction information is used to instruct the CU to start tracing the UE. In this way, the CU can start tracing the user equipment.

With reference to any one of the fifth aspect or the first to the third possible implementations of the fifth aspect, in a fourth possible implementation of the fifth aspect, the trace activation instruction information includes an instruction for starting, on the Xn interface and/or the NG interface and/or the F1 interface, tracing the UE.

With reference to any one of the fifth aspect or the first to the fourth possible implementations of the fifth aspect, in a fifth possible implementation of the fifth aspect, before the sending, by the CU, a first message to the DU, the method provided in this application further includes: receiving, by the CU, fourth indication information sent by the DU, where the fourth indication information is used to query whether the DU needs to start tracing the UE. In this way, when the DU does not receive an instruction, sent by the CU, that the trace for the UE needs to be started, the DU may send the fourth indication information to the CU. In this way, the DU can actively query whether the CU needs to trigger the DU to start tracing the UE.

With reference to any one of the fifth aspect or the first to the fifth possible implementations of the fifth aspect, in a sixth possible implementation of the fifth aspect, the method provided in this application further includes: sending, by the CU, a second message carrying second instruction information to the DU, where the second instruction information is used to instruct the DU to deactivate the trace for the UE. In this case, the CU may trigger, when determining that the master base station or the core network control plane entity deactivates the trace for the UE by the CU, the DU to deactivate the trace for the UE. Alternatively, the CU may self-determine to trigger the DU to deactivate the trace for the UE.

With reference to any one of the fifth aspect or the first to the sixth possible implementations of the fifth aspect, in a seventh possible implementation of the fifth aspect, the second instruction information includes at least one of a trace identifier corresponding to the trace deactivation and a deactivation cause. At least one of the trace identifier corresponding to the trace deactivation and the deactivation cause is carried, so that the DU can determine a task on which trace deactivation is to be performed and a cause of the deactivation.

With reference to any one of the fifth aspect or the first to the seventh possible implementations of the fifth aspect, in an eighth possible implementation of the fifth aspect, the method provided in this application further includes: receiving, by the CU, a third message that is sent by the DU and that carries third indication information, where the third indication information is used to indicate that the DU fails to start tracing the UE.

With reference to any one of the fifth aspect or the first to the eighth possible implementations of the fifth aspect, in a ninth possible implementation of the fifth aspect, the third indication information includes at least one of a trace identifier corresponding to the trace start failure and a trace start failure cause. At least one of the trace identifier corresponding to the trace start failure and the trace start failure cause (for example, that the UE changes the secondary base station) is sent to the CU, so that the CU can determine, based on the trace identifier, that the DU fails to start a task indicated by the trace identifier, and determine a cause of the start failure based on the trace start failure cause, to facilitate subsequent processing.

With reference to any one of the fifth aspect or the first to the ninth possible implementations of the fifth aspect, in a tenth possible implementation of the fifth aspect, the method provided in this application further includes: receiving, by the CU, a trace result for the UE that is sent by the DU; and sending, by the CU to a target server, a fourth message including at least one of the trace result of the DU for the UE and a trace result of the CU for the UE. The CU feeds back the trace results to the target server, so that the target server can perform centralized analysis on the fed back trace results.

With reference to any one of the fifth aspect or the first to the tenth possible implementations of the fifth aspect, in an eleventh possible implementation of the fifth aspect, the fourth message further includes indication information used to indicate a device corresponding to the trace result for the UE, to help the target server distinguish whether a received feedback result is obtained through trace by the CU or by the DU.

According to a sixth aspect, an embodiment of the present disclosure provides a user equipment tracing method, including: receiving, by a DU, a first message that is sent by a CU and that carries first instruction information, where the first instruction information is used to instruct the DU to start tracing UE; and starting, by the DU according to the first instruction information, tracing the UE.

With reference to the sixth aspect, in a first possible implementation of the sixth aspect, the first instruction information includes at least one of the following information: a trace identifier; an interface-to-trace indication, used to indicate a specified interface on which trace for a user equipment is to be started; a trace depth indication; a trace collection entity IP address; or configuration information for minimization of drive tests.

With reference to the sixth aspect or the first possible implementation of the sixth aspect, in a second possible implementation of the sixth aspect, the specified interface includes at least one of the following: an S1 interface, an X2 interface, a Uu interface, an Xn interface, an NG interface, or an F1 interface.

With reference to any one of the sixth aspect or the first to the second possible implementations of the sixth aspect, in a third possible implementation of the sixth aspect, before the receiving, by a DU, a first message sent by a CU, the method provided in this application further includes: sending, by the DU, fourth indication information to the CU, where the fourth indication information is used to query whether the DU needs to start tracing the UE.

With reference to any one of the sixth aspect or the first to the third possible implementations of the sixth aspect, in a fourth possible implementation of the sixth aspect, the method provided in this application further includes: receiving, by the DU, a second message that is sent by the CU and that carries second instruction information, where the second instruction information is used to instruct the DU to deactivate the trace for the UE.

With reference to any one of the sixth aspect or the first to the fourth possible implementations of the sixth aspect, in a fifth possible implementation of the sixth aspect, the second instruction information includes at least one of a trace identifier corresponding to the trace deactivation and a deactivation cause.

With reference to any one of the sixth aspect or the first to the fifth possible implementations of the sixth aspect, in a sixth possible implementation of the sixth aspect, the method provided in this application further includes: sending, by the DU, a third message carrying third indication information to the CU, where the third indication information is used to indicate that the DU fails to start tracing the UE.

With reference to any one of the sixth aspect or the first to the sixth possible implementations of the sixth aspect, in a seventh possible implementation of the sixth aspect, the third indication information includes at least one of a trace identifier corresponding to the trace start failure and a trace start failure cause.

With reference to any one of the sixth aspect or the first to the seventh possible implementations of the sixth aspect, in an eighth possible implementation of the sixth aspect, the method provided in this application further includes: sending, by the DU, a trace result for the UE to the CU.

According to a seventh aspect, an embodiment of the present disclosure provides a CU. The CU has a function of implementing a function of the CU according to any one of the fifth aspect or the method designs of the fifth aspect. These functions may be implemented by hardware, or may be implemented by hardware by executing corresponding software. The hardware or the software includes one or more units corresponding to the foregoing functions.

In a possible design, a specific structure of the CU may include a processing unit and a sending unit. Optionally, the CU may further include a receiving unit. The sending unit, the receiving unit, and the processing unit may perform a corresponding function in the method according to any one of the fifth aspect or the possible designs of the fifth aspect.

According to an eighth aspect, a DU is provided. The DU has a function of implementing a function of the DU according to any one of the sixth aspect or the method designs of the sixth aspect. These functions may be implemented by hardware, or may be implemented by hardware by executing corresponding software. The hardware or the software includes one or more units corresponding to the foregoing functions.

In a possible design, a specific structure of the DU may include a receiving unit and a processing unit. Optionally, the DU may further include a sending unit. The sending unit, the receiving unit, and the processing unit may perform a corresponding function in the method according to any one of the sixth aspect or the possible designs of the sixth aspect.

According to a ninth aspect, a user equipment tracing apparatus is provided. The user equipment tracing apparatus may be the CU in the foregoing method designs, or may be a chip disposed in the CU. The user equipment tracing apparatus includes: a memory, configured to store computer-executable program code; a communications interface; and a processor, where the processor is coupled to the memory and the communications interface. The program code stored in the memory includes an instruction, and when the processor executes the instruction, the user equipment tracing apparatus is enabled to perform the method performed by the CU according to any one of the fifth aspect or the possible designs of the fifth aspect.

According to a tenth aspect, a user equipment tracing apparatus is provided. The user equipment tracing apparatus may be the DU in the foregoing method designs, or may be a chip disposed in the DU. The communications apparatus includes: a memory, configured to store computer-executable program code; a communications interface and a processor, where the processor is coupled to the memory and the communications interface. The program code stored in the memory includes an instruction, and when the processor executes the instruction, the user equipment tracing apparatus is enabled to perform the method performed by the DU according to any one of the sixth aspect or the possible designs of the sixth aspect.

According to an eleventh aspect, a computer-readable storage medium is provided. The computer-readable storage medium stores an instruction, and when the instruction is run on a master base station, the master base station is enabled to perform the method according to any one of the first aspect or the possible designs of the first aspect.

According to a twelfth aspect, a computer-readable storage medium is provided. The computer-readable storage medium stores an instruction, and when the instruction is run on a secondary base station, the secondary base station is enabled to perform the method according to any one of the second aspect or the possible designs of the second aspect.

According to a thirteenth aspect, a computer-readable storage medium is provided. The computer-readable storage medium stores an instruction, and when the instruction is run on a CU, the CU is enabled to perform the method according to any one of the fifth aspect or the possible designs of the fifth aspect.

According to a fourteenth aspect, a computer-readable storage medium is provided. The computer-readable storage medium stores an instruction, and when the instruction is run on a DU, the DU is enabled to perform the method according to any one of the sixth aspect or the possible designs of the sixth aspect.

According to a fifteenth aspect, a computer program product including an instruction is provided. The computer program product stores the instruction, and when the instruction is run on a master base station, the master base station is enabled to perform the method according to any one of the first aspect or the possible designs of the first aspect.

According to a sixteenth aspect, a computer program product including an instruction is provided. The computer program product stores the instruction, and when the instruction is run on a secondary base station, the secondary base station is enabled to perform the method according to any one of the second aspect or the possible designs of the second aspect.

According to a seventeenth aspect, a computer program product including an instruction is provided. The computer program product stores the instruction, and when the instruction is run on a CU, the CU is enabled to perform the method according to any one of the fifth aspect or the possible designs of the fifth aspect.

According to an eighteenth aspect, a computer program product including an instruction is provided. The computer program product stores the instruction, and when the instruction is run on a DU, the DU is enabled to perform the method according to any one of the sixth aspect or the possible designs of the sixth aspect.

According to a nineteenth aspect, this application provides a communications system. The communications system includes at least a network entity, a core network device, a master base station, a secondary base station, and user equipment. The network entity is configured to receive trace results for the user equipment that are separately reported by the master base station and the secondary base station, and perform centralized processing on the trace results for the user equipment that are separately reported by the master base station and the secondary base station.

In the embodiments of this application, when starting tracing the user equipment, the master base station sends, to the secondary base station, the first instruction information used to start tracing the user equipment, to trigger the secondary base station to start tracing the user equipment. In this way, the target server can perform centralized processing on the trace results fed back by the master base station and the secondary base station. For example, corresponding timestamps are added to the trace results fed back by the master base station and the secondary base station. In this way, the target server can determine trace results for a same task of same user equipment on different devices at a same time based on the timestamps, to facilitate the centralized processing.

DESCRIPTION OF EMBODIMENTS

In this application, "at least one" refers to one or more. "A plurality of" refers to two or more than two. A term "and/or" describes an association relationship for describing associated objects and represents that three relationships may exist. For example, A and/or B may represent the following three cases: Only A exists, both A and B exist, and only B exists. A and B may be in a singular or plural form. The character "/" generally indicates an "or" relationship between associated objects "At least one of the following items" or a similar expression thereof indicates any combination of the items, and includes any combination of one or more of the items. For example, at least one (piece) of a, b, or c may represent a, b, c, a combination of a and b, a combination of a and c, a combination of b and c, or a combination of a, b, and c, where a, b, and c may be in a singular or plural form. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

Figure 1:
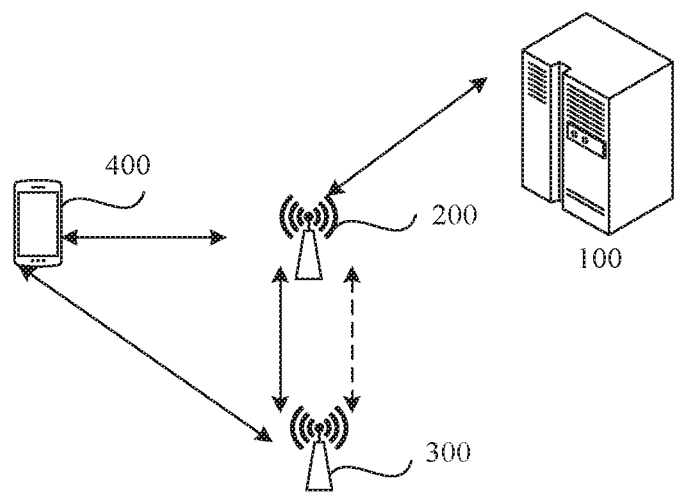
FIG. 1 is a schematic architectural diagram of a communications system according to an embodiment of the present disclosure.

FIG. 1 is a schematic architectural diagram of a communications system to which a user equipment tracing method provided in this application is applied. As shown in FIG. 1, the communications system includes: a core network control plane entity 100, at least one master base station 200 (only one master base station is shown in FIG. 1) connected to the core network control plane entity 100, at least one secondary base station 300 (only one secondary base station is shown in FIG. 1) connected to the master base station 200, and one or more user equipments (UE) 400 connected to the master base station 200 and the secondary base station 300. There is a control plane connection between the core network control plane entity 100 and the at least one master base station 200. There is a first interface between the master base station 200 and the secondary base station 300.

Optionally, the communications system shown in FIG. 1 may further include a core network, and the master base station 200 and the secondary base station 300 may be connected to the core network. The core network may be a 4G core network (for example, an evolved packet core (EPC)) or a 5G core network (SGC).

The master base station 200 is the first base station randomly accessed by the user equipment 400. The master base station 200 is responsible for establishing a control plane connection to the core network control plane entity 100, transmitting signaling and a message, determining whether a secondary base station is required, and selecting a secondary base station for the UE 400.

The secondary base station 400 is a second base station other than the master base station 200, is configured to provide an additional radio resource node for the UE, and has no direct control plane connection to the core network control plane entity 100.

In an example, in this embodiment of this application, the master base station 200 and the secondary base station 300 may be base stations of a same network standard. For example, the master base station 200 and the secondary base station 300 are evolved NodeBs (NB or eNodeB) in a 4G system. For another example, both the master base station 200 and the secondary base station 300 may be next generation NodeBs (gNB) in an NR system.

In another example, in this embodiment of this application, the master base station 200 and the secondary base station 300 may be base stations of different network standards. For example, a network standard corresponding to the master base station 200 is an eNB in a 4G system, and a network standard corresponding to the secondary base station 300 is a gNB in an NR system. Alternatively, a network standard corresponding to the master base station 200 is a gNB in an NR system, and a network standard corresponding to the secondary base station 300 is an eNB in a 4G system.

In still another example, the master base station 200 is a 3rd generation partnership project (3GPP) base station, and the secondary base station 300 is a non-3GPP base station. Alternatively, the master base station 200 is a non-3GPP base station, and the secondary base station 300 is a 3GPP base station.

Because the master base station 200 and the secondary base station 300 correspond to different network standards, the first interface has different names. Descriptions are separately provided below.

For example, when network standards corresponding to the master base station 200 and the secondary base station 300 are both gNBs in the NR system, the first interface is an Xn interface.

For example, when a network standard corresponding to the master base station 200 is an eNB in the 4G system, and a network standard corresponding to the secondary base station 300 is a gNB in the NR system, the first interface is an X2 interface. For example, when the master base station 200 and the secondary base station 300 are eNBs in the 4G system, the first interface is an X2 interface. For example, when a network standard corresponding to the master base station 200 is a gNB in the NR system, and a network standard corresponding to the secondary base station 300 is an eNB in the LTE system, the first interface is an X2 interface.

The foregoing names of the first interface are merely examples. The name of the interface between the master base station 200 and the secondary base station 300 is not limited in this embodiment of this application.

A wireless Uu interface may be established between the master base station and the user equipment 400, and a wireless Uu interface is also established between the secondary base station and the user equipment 400. For example, user plane data and control plane signaling may be transmitted between the master base station 200 and the user equipment 400 through the Uu interface, and the user plane data may be transmitted between the secondary base station 300 and the user equipment 400 through the wireless Uu interface. A user plane of the Uu interface is mainly configured to transmit user data, and a control plane is configured to: transmit related signaling; and set up, reconfigure, and release various mobile communications radio bearer services.

In the architecture shown in FIG. 1, in a 5G scenario, an interface between a core network device (for example, an access and mobility management function (AMF)) and any one of the at least one master base station (5G base station) is referred to as an NG interface, and a control plane of the NG interface may be referred to as an NG control plane (NG-C). In a 4G scenario, an interface between the master base station (4G base station) 200 and a core network device (for example, a mobility management entity (MME)) 100 is an S1 interface. In a new radio (NR)-NR DC or NR-LTE DC scenario, an interface between the master base station and the secondary base station is an Xn interface for supporting signaling exchange between the two base stations. In an LTE-NR DC scenario, an interface between an MeNB and an SgNB is an X2 interface.

A wireless Uu interface is established between the master base station and the UE in any one of the foregoing DC scenarios, to transmit the user plane data and the control plane signaling between the master base station and the UE, and a wireless Uu interface is also established between the secondary base station and the UE, to transmit the user plane data between the secondary base station and the UE. In other words, the UE is in a dual connectivity (DC) architecture mode. The user plane of the Uu interface is mainly configured to transmit user data. The control plane is configured to transmit related signaling; and set up, reconfigure, and release various mobile communications radio bearer services.

The master base station 200 and the secondary base station 300 in this application may be base stations that can communicate with the user equipment 400, and may be an access point (AP) in a wireless local area network (WLAN), a base transceiver station (BTS) in a global system for mobile communications (GSM) or code division multiple access (CDMA), a NodeB (NodeB, NB) in wideband code division multiple access (WCDMA), an evolved NodeB (eNB or eNodeB), a relay station, an access point, a vehicle-mounted device, or a wearable device in LTE, a next generation NodeB (gNB) in a future 5G network, a network device in a future evolved public land mobile network (PLMN), or the like.

In the embodiments of this application, the user equipment (UE) is a device that provides voice and/or data connectivity to a user, for example, a handheld device having a wireless connection function or a vehicle-mounted device. The user equipment may alternatively be referred to as a terminal, an access terminal, a user unit, a user station, a mobile station, a mobile, a remote station, a remote terminal, mobile equipment, a user terminal, wireless telecom equipment, a user agent, user equipment, or a user apparatus. The terminal may be a station (STA) in a wireless local area network (WLAN); or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, a terminal in a next generation communications system (for example, a fifth generation (5G) communications network), a terminal in a future evolved public land mobile network (PLMN), or the like. 5G may alternatively be referred to as new radio (NR).

In an example, in the embodiments of the present disclosure, the terminal device may alternatively be a wearable device. The wearable device may alternatively be referred to as a wearable intelligent device, and is a general term for wearable devices such as glasses, gloves, watches, clothes, and shoes that are developed by applying wearable technologies to intelligent designs of daily wear. The wearable device is a portable device that is directly worn on a body or integrated into clothes or an accessory of a user. The wearable device is not only a hardware device, but also implements powerful functions through software support, data exchange, and cloud interaction. In a broad sense, wearable intelligent devices include full-featured and large-sized devices that can implement all or some functions without depending on smartphones, such as smartwatches or smart glasses, and devices that focus on only one type of application function and need to work with other devices such as smartphones, such as various smart hands or smart jewelry for monitoring physical signs.

Figure 2:
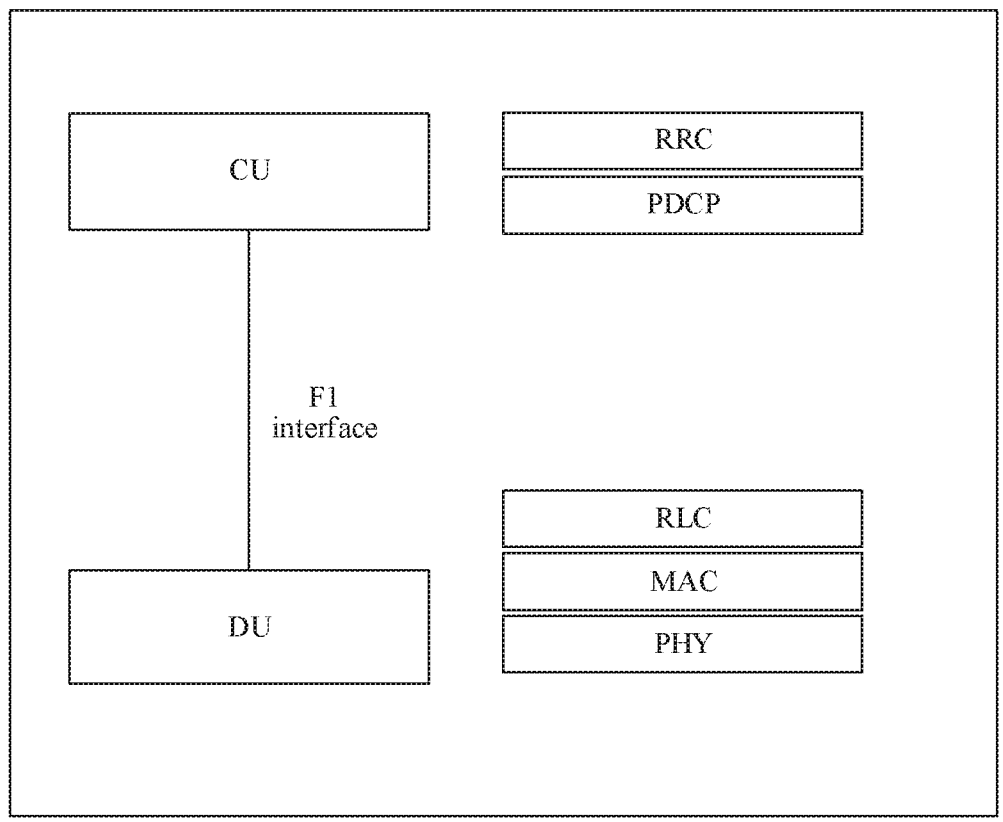
FIG. 2 is a schematic architectural diagram of another communications system according to an embodiment of the present disclosure.

A future access network may be implemented by using a cloud radio access network (C-RAN) architecture. In a possible implementation, a protocol stack architecture and function of a conventional base station are divided into two parts, one part is referred to as a centralized unit (CU), and the other part is referred to as a distributed node (DU). However, actual deployment modes of the CU and the DU are relatively flexible. For example, CU parts of a plurality of base stations are integrated together to form a relatively large-scale function entity. In view of this, this application provides a RAN internal architecture. As shown in FIG. 2, a base station includes a CU and a DU. There is a CU-DU interface between the CU and the DU. The CU-DU interface may alternatively be referred to as an F1 interface, a control plane of the CU-DU interface is referred to as F1-C, and a user plane of the CU-DU interface is referred to as F1-U.

The CU may be connected to a core network device. Therefore, the CU may be triggered by using a core network control plane entity to start tracing user equipment, and there is no interface between the DU and the core network control plane entity. Similar to an NG interface, the F1-C interface may be used to transmit two types of messages: a UE-associated message and common signaling. The UE-associated message may be used in processes such as session management, mobility management, and context management of the UE, and the common signaling may be used for interface management, configuration update of the CU/DU, and the like.

As shown in FIG. 2, the CU and the DU have different functions based on different division into protocol layers of a wireless network. For example, functions of a packet data convergence protocol (PDCP) layer and a radio resource control (RRC) layer located above the PDCP layer are set on the CU, and functions of protocol layers below the PDCP layer, for example, a radio link control (RLC) layer, a media access control (MAC) layer, and a physical layer (PHY), are set on the DU.

The division into protocol layers is merely an example, and division may alternatively be performed at another protocol layer, for example, at the RLC layer. Functions of the RLC layer and layers above the RLC layer are set on the CU, and functions of protocol layers below the RLC layer are set on the DU. Alternatively, division is performed in a specific protocol layer. For example, some functions of the RLC layer and functions of protocol layers above the RLC layer are set on the CU, and remaining functions of the RLC layer and functions of protocol layers below the RLC layer are set on the DU. In addition, division may alternatively be performed in another manner, for example, performed based on a latency. A function whose processing time needs to meet a latency requirement is set on the DU, and a function whose processing time does not need to meet the latency requirement is set on the CU.

In addition, a radio frequency apparatus may not be arranged in the DU and is arranged away from the DU, or may be integrated into the DU; or a part of the radio frequency apparatus is arranged away from the DU, and the other part is integrated into the DU. This is not limited herein.

In addition, the future access network may further use an NFV technology, so that an access network function entity can be dynamically expanded and migrated. Therefore, in the architecture shown in FIG. 2, the CU sends first instruction information to the DU through the F1 interface, to trigger the DU to trace the UE.

It may be understood that the architectures shown in FIG. 1 and FIG. 2 are merely examples of a scenario to which the method provided in this application is applied, and do not constitute a limitation on this application. The technical solutions provided in this application may also be applied to two components in any base station (for example, a CU and a DU in a gNB) in a 2G, a 3G, a 4G, a 5G, and a future communications system, or a communications scenario in which a secondary base station needs to be triggered to trace UE.

An objective of this application is: In a DC scenario, user equipment maintains dual connectivity with both a master base station (for example, an LTE eNB) and a secondary base station (for example, an NR In this case, both the master base station and the secondary base station have data and signaling. The MeNB transmits a related trace parameter to the SgNB, to activate the SgNB to start tracing the UE, so that the master base station and the secondary base station simultaneously trace/monitor a service status or performance of the UE on the master base station and the secondary base station in the DC scenario, and feed back trace results for the UE to an OAM management entity, to help the OAM management entity find an exception in time and quickly locate a network fault and problem, thereby facilitating device maintenance and fault removal.

Figure 3:
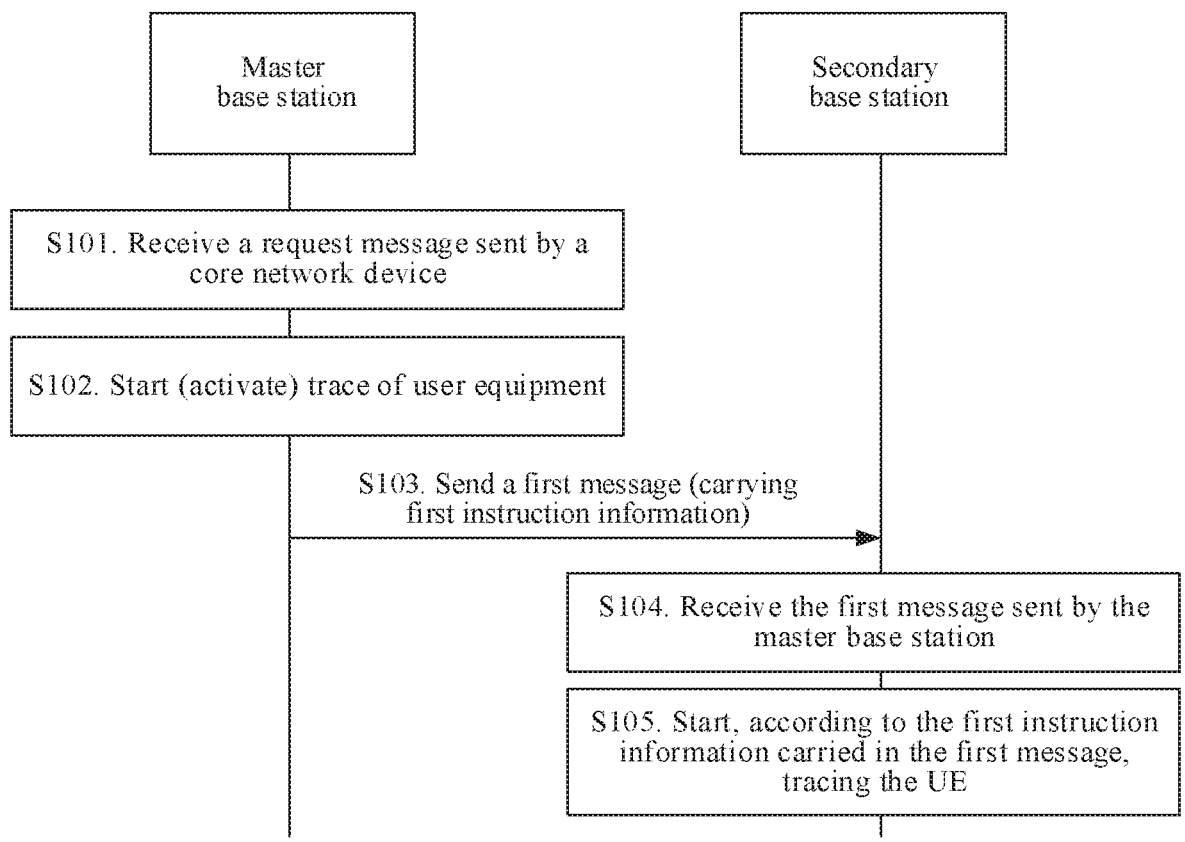
FIG. 3 is a schematic flowchart 1 of a user equipment tracing method according to an embodiment of the present disclosure.

In the following embodiment, the user equipment tracing method in this application is described in detail by using a master base station and a secondary base station as an example. It may be understood that, in an actual process, the method provided in this application is also applicable to a scenario including a CU and a DU. As shown in FIG. 3, this application provides a user equipment tracing method, including the following steps.

S101. The master base station receives a request message sent by a core network device, where the request message is used to request the master base station to initiate trace for user equipment.

Optionally, the core network device may be an MME or an AMF. The request message may carry identifier information of the to-be-traced user equipment and trace activation instruction information (Trace Activation IE). The trace activation instruction information is used to instruct the master base station to start tracing the user equipment. The trace activation instruction information includes one or more of a trace ID, an interface-to-trace indication, a trace depth indication, a trace collection entity IP address, and an MDT parameter. The identifier information of the to-be-traced UE is used to identify the to-be-traced UE, and the trace ID is used to identify a trace task on the to-be-traced UE. The interface-to-trace indication is used to instruct the master base station to trace the UE on a specified interface. The interface-to-trace indication is used to indicate a trace interface in a form of a bitmap, and the bitmap usually includes eight bits. The first bit is used to indicate an S1 interface, the second bit is used to indicate an X2 interface, and the third bit is used to indicate a Uu interface. In this application, a reserved bit in the interface-to-trace indication is used to indicate an F1 interface, an Xn interface, or an NG interface.

S102. The master base station starts (activates) the trace for the user equipment.

S103. The master base station sends a first message to the secondary base station, where the first message carries first instruction information, and the first instruction information is used to instruct the secondary base station to start tracing the UE.

It should be noted that in this application, the master base station may immediately send the first message to the secondary base station after starting tracing the user equipment, to trigger the secondary base station to trace the user equipment, thereby implementing joint trace by the master base station and the secondary base station. Alternatively, the master base station may send the first message to the secondary base station after a period of time after the master base station starts tracing the user equipment. This is not limited in this application. Certainly, the first message may further carry a specified time and a specified cycle, to instruct the secondary base station to start, at the specified time, tracing the user equipment.

In an actual process, the master base station usually starts tracing the user equipment in two scenarios: Scenario 1 in which the user equipment has not enabled a dual connectivity function; and Scenario 2 in which the user equipment has enabled a dual connectivity function. In different scenarios, types of the first message sent by the master base station to the secondary base station are different. Therefore, the following separately provides descriptions with reference to different scenarios.

On one hand, in Scenario 1, when the master base station triggers the trace for the user equipment, the first message may be a secondary base station addition request (SeNB/SgNB Addition Request) message, to be specific, the master base station additionally adds a new field to the SeNB/SgNB Addition Request message to carry the trace activation instruction information, for example, the Trace Activation IE, to trigger the secondary base station to trace the user equipment. In this way, in a process of establishing a connection between the UE and the secondary base station, the secondary base station can start tracing the user equipment.

On the other hand, in Scenario 2, when the master base station triggers the trace for the user equipment, the first message may be a secondary base station modification request (SeNB/SgNB Modification Request) message, to be specific, the master base station additionally adds a new field to the SeNB/SgNB Modification Request message to carry the trace activation instruction information, for example, the Trace Activation IE, to trigger the secondary base station to trace the user equipment.

In both Scenario 1 and Scenario 2, the master base station extends existing standard signaling (SeNB/SgNB Addition Request or SeNB/SgNB Modification Request) between the master base station and the secondary base station, for example, adds the first instruction information, to trigger the secondary base station to start tracing the user equipment. In an actual process, the first message may alternatively be a newly defined message. For example, the first instruction information may alternatively be transmitted by using a newly defined X2/Xn interface message.

S104. The secondary base station receives the first message sent by the master base station.

the secondary base station may receive the SeNB/SgNB Addition Request message, the SeNB/SgNB Modification Request message, or the newly defined X2/Xn interface message that is sent by the master base station.

S105. The secondary base station starts, according to the first instruction information carried in the first message, tracing the UE.

Optionally, the first instruction information may include at least one of the following information: a trace identifier; the interface-to-trace indication, used to indicate an interface on which trace for a user equipment is to be started; the trace depth indication; the trace collection entity IP address; or the configuration information for minimization of drive tests.

It may be understood that, after receiving the first instruction information, the secondary base station may immediately start tracing the UE, or may start, at the specified time based on the specified time carried in the first instruction information, tracing the user equipment. This is not limited in this application.

The interface-to-trace indication in the first instruction information (for example, the Trace Activation IE) may indicate at least one of the S1 interface, the F1 interface, the X2 interface, the Uu interface, the Xn interface, or the NG interface. It may be learned from the foregoing content that the Xn interface, the NG interface, and the F1 interface may be indicated by using the reserved field in the first instruction information. Therefore, in this application, a definition of Interfaces To Trace IE in the Trace Activation IE is extended to instruct, by using the reserved field, to start the trace for the user equipment on the Xn/NG/F1 interface. For example, a reserved field of the fourth bit is used to indicate the Xn interface, a reserved field of the fifth bit is used to indicate the NG interface, and a reserved field of the sixth bit is used to indicate the F1 interface.

In an actual process, there may be a plurality of UEs that establish a connection to the secondary base station. Therefore, the first instruction information may further carry the identifier information of the user equipment. The identifier information is used by the secondary base station to identify the UE that needs to be traced, and the identifier information may be a user identifier on the X2/Xn interface, for example, an UE X2AP ID and/or an SgNB UE X2AP ID. Usually, the master base station sends both the identifier information of the UE and the trace ID to the secondary base station. Therefore, the secondary base station may determine, based on the identifier information of the user equipment, to start a trace task for the indicated UE. An identifier corresponding to the trace task is the trace ID.

Because in a conventional technical solution, trace for user equipment by a secondary base station in a DC scenario is not considered, and the secondary base station has no parameter for tracing the user equipment, the secondary base station cannot start tracing the user equipment. In this application, the master base station sends the first message to the secondary base station when starting tracing the user equipment, to send, to the secondary base station, the first instruction information for tracing the user equipment, thereby triggering the secondary base station to trace the user equipment. In this way, the secondary base station and the master base station can jointly trace the user equipment.

In an actual process, a network entity (for example, an element management system (EMS) device) may learn of an interface between the master base station and the secondary base station, or may not learn of the interface between the master base station and the secondary base station (or may learn or not learn whether the user equipment works in the DC scenario). Therefore, when the network entity does not learn of the interface between the master base station and the secondary base station (or does not learn that the user equipment works in the DC scenario), an instruction that is for starting, on the Xn interface and/or the NG interface and/or the F1 interface, tracing the UE and that is included in the trace activation instruction information may be determined by the master base station and added to the first instruction information. When the network entity learns of the interface between the master base station and the secondary base station (or learns that the user equipment works in the DC scenario), optionally, an instruction that is for starting, on the Xn interface and/or the NG interface and/or the F1 interface, tracing the UE and that is included in the trace activation instruction information may be determined by the network entity and added to the trace activation instruction information, and then the trace activation instruction information is sent to the master base station. The master base station adds the instruction to the first instruction information, and then sends the first instruction information to the secondary base station.

It may be understood that, in addition to the instruction for starting, on the Xn interface and/or the NG interface and/or the F1 interface, tracing the UE, the trace activation instruction information may further include information such as the trace identifier, the trace depth indication, the trace collection entity IP address, and the configuration information for minimization of drive tests.

Figure 4:
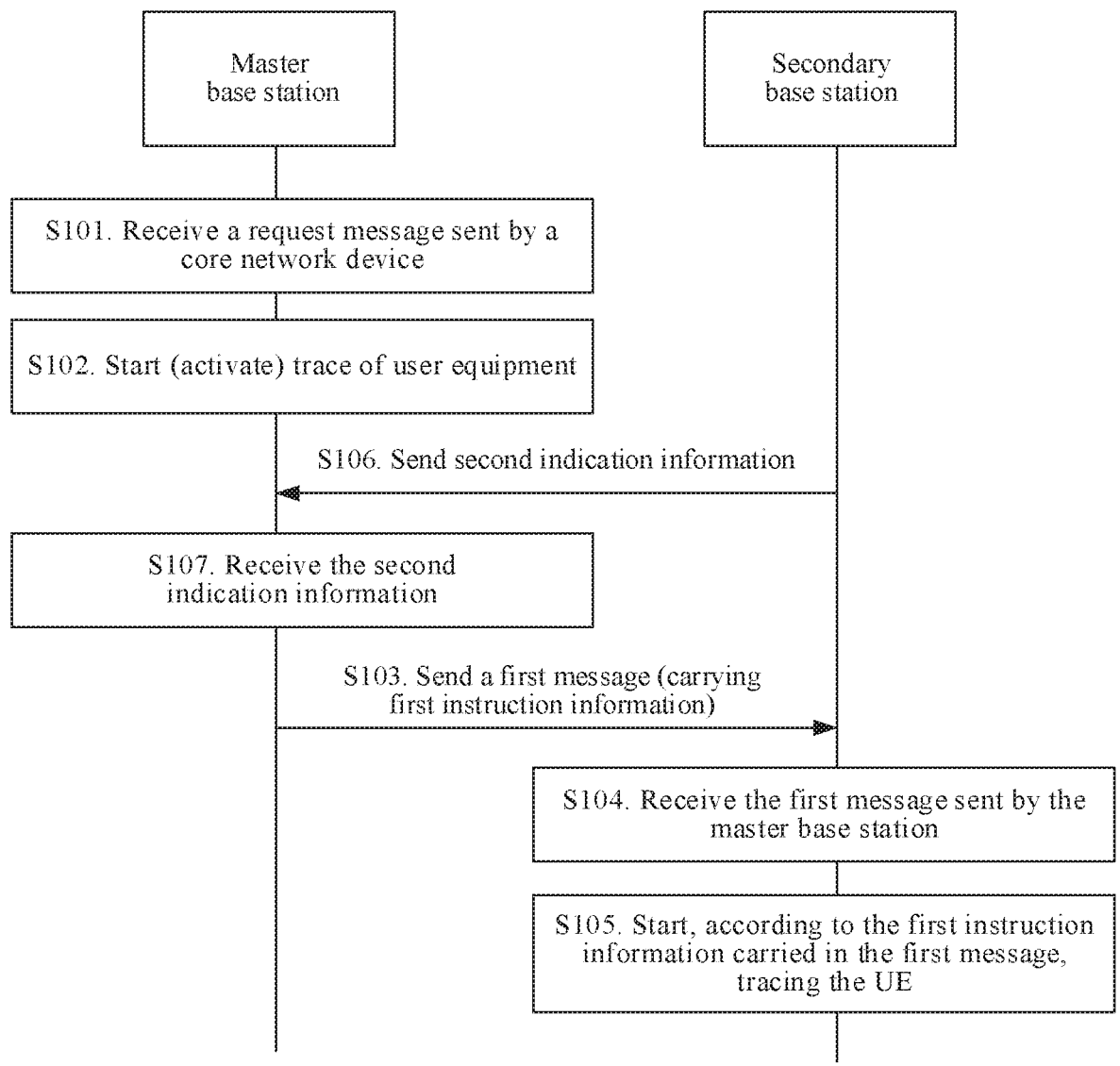
FIG. 4 is a schematic flowchart 2 of a user equipment tracing method according to an embodiment of the present disclosure.

In an actual process, the master base station may actively trigger the secondary base station to trace the user equipment, or may trigger, at the request of the secondary base station, the secondary base station to trace the user equipment. Therefore, when the master base station triggers, at the request of the secondary base station, the secondary base station to trace the user equipment, as shown in FIG. 4, before step S103, the method provided in this application further includes the following steps.

S106. The secondary base station sends fourth indication information to the master base station, where the second indication information is used to query whether the secondary base station starts tracing the UE.

Optionally, the fourth indication information may be carried in a message, and then the message is sent to the master base station. The message may be a newly defined message, for example, a trace request message, or may be an existing message of the master base station and the secondary base station. This is not limited in this application.

It may be understood that when sending the fourth indication information to the master base station, the secondary base station has been configured to allow the UE to perform a dual connectivity operation.

S107. The master base station receives the fourth indication information.

It may be understood that, when determining that the secondary base station needs to start tracing the UE, the master base station sends the first message to the secondary base station. Alternatively, if the master base station has not started, when receiving the fourth indication information, tracing the UE, the master base station may notify the secondary base station that the secondary base station does not need to start tracing the UE. The master base station determines, only when the master base station is instructed by the core network device to trigger the trace for the UE, that the first message needs to be sent to the secondary base station immediately or after a period of time.

It should be noted that, in an actual process, when the master base station actively triggers the secondary base station to start tracing the user equipment, steps S106 and S107 may be omitted.

Optionally, in this application, when the master base station triggers the secondary base station to start tracing the user equipment, the trace identifier carried in the first instruction information may be allocated by the network entity and then sent to the master base station by using the core network device.

the master base station and the secondary base station use a same trace ID (the same trace ID is generated by the network entity, then sent to the core network device, and then sent by the core network device to the master base station). In this scenario, the master base station directly forwards, to the secondary base station, the Trace Activation IE received from the core network device; or the master base station modifies some parameters in the Trace Activation IE and then sends the Trace Activation IE to the secondary base station, to trigger the secondary base station to start tracing the user equipment. In addition, the network entity may alternatively configure different trace IDs, for example, a first trace ID and a second trace ID, for the master base station and the secondary base station. The first trace ID is used by the master base station to trace the user equipment, and the second trace ID is used by the secondary base station to trace the user equipment. It may be understood that there is an association relationship between the first trace ID and the second trace ID. The corresponding second trace ID for the secondary base station may be found based on the first trace ID for the master base station, and vice versa. Tasks indicated by the first trace ID and the second trace ID are a same task or event. When the master base station and the secondary base station have different trace IDs, and when the master base station determines that the secondary base station needs to be triggered to trace the user equipment, the master base station adds the second trace ID to the first instruction information.

Figure 5:
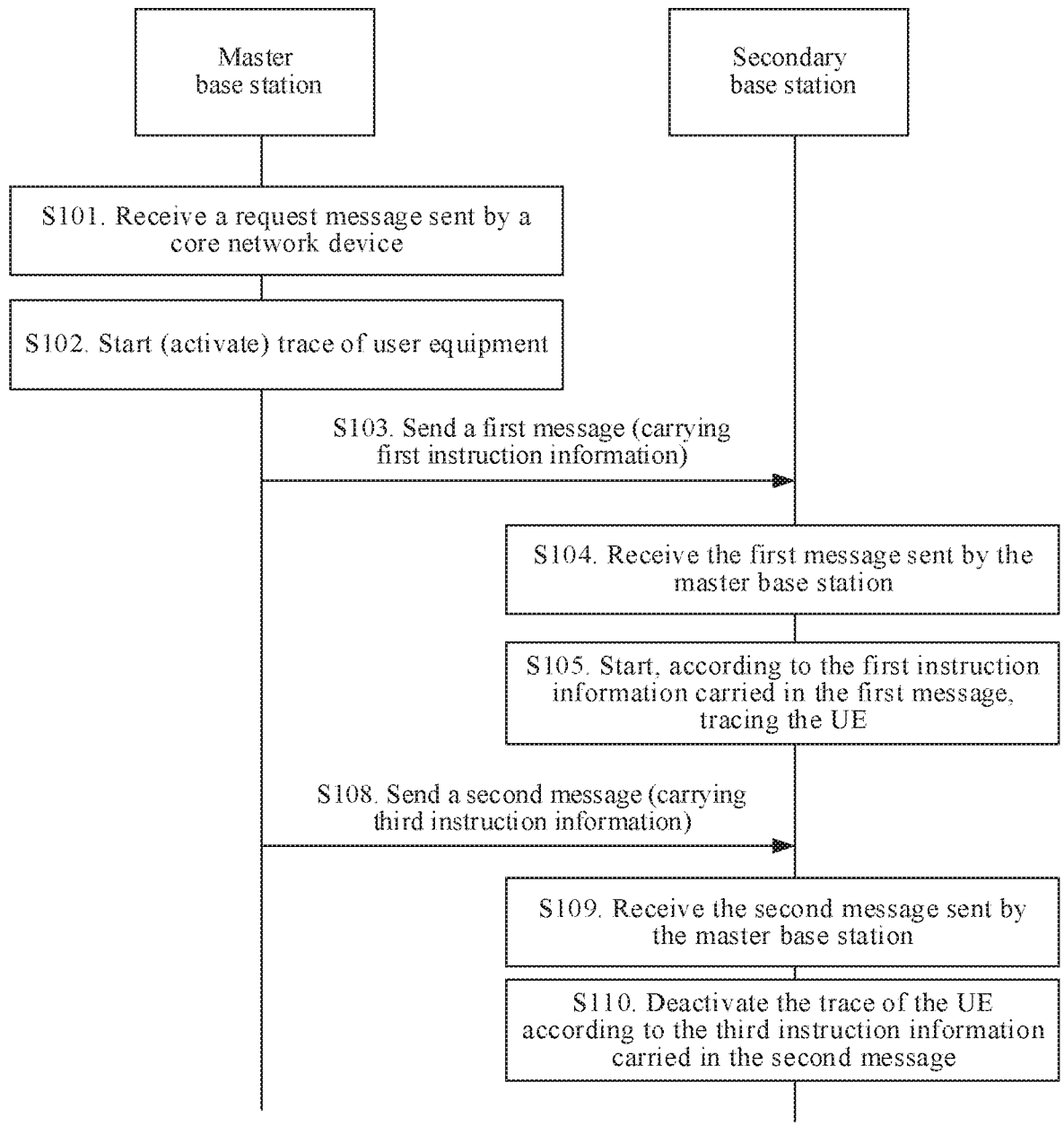
FIG. 5 is a schematic flowchart 3 of a user equipment tracing method according to an embodiment of the present disclosure.

In an actual process, after the trace for the user equipment is triggered, the core network device may further request, by using a Deactivate Trace message, the master base station to stop tracing the user equipment, where the message carries a trace identifier (Trace ID) parameter. After receiving the message, the master base station stops a user trace task corresponding to the trace ID. Therefore, in the method provided in this application, the master base station may further instruct the secondary base station to deactivate the trace for the user equipment. In another possible implementation, as shown in FIG. 5, after step S105, the method provided in this application further includes the following steps.

S108. The master base station sends a second message to the secondary base station, where the second message carries second instruction information, and the second instruction information is used to instruct the secondary base station to deactivate the trace for the UE.

Optionally, the second message may be a secondary base station modification request message, or may be a newly defined message. The second instruction information may be at least one of a trace identifier corresponding to the trace deactivation and a deactivation cause. To be specific, the second instruction information may include: a trace identifier corresponding to the trace deactivation; a deactivation cause; or a trace identifier corresponding to the trace deactivation and a deactivation cause. The trace identifier corresponding to the trace deactivation is used to instruct the secondary base station to determine a to-be-deactivated trace task or event. Certainly, the second message may further include identifier information of UE corresponding to the trace deactivation, to instruct to determine user equipment corresponding to the trace deactivation.

S109. The secondary base station receives the second message sent by the master base station.

S110. The secondary base station deactivates the trace for the user equipment based on the third instruction information carried in the second message.

the secondary base station determines, based on the identifier information of the UE corresponding to the trace deactivation that is carried in the third instruction information, UE on which a trace deactivation operation is to be performed, and determines a to-be-deactivated trace task or event based on the trace identifier corresponding to the trace deactivation.

In an actual process, if a Trace Start procedure or a Deactivate Trace procedure fails (due to handover of the user equipment), the master base station sends a trace failure indication message to the core network device, where the trace failure indication message carries a trace ID and a cause parameter. After receiving the trace failure indication message, the core network device may learn that a user equipment trace task corresponding to the trace ID fails to be started, and learn of a cause of the failure based on the cause parameter. Similarly, when the master base station instructs the secondary base station to activate the trace for the user equipment, if the secondary base station fails, because the UE needs to change the secondary base station or due to another cause, to start tracing the user equipment, the secondary base station needs to feed back, to the master base station, a failure in starting the trace for the user equipment. In this way, the master base station may further perform subsequent processing based on the feedback from the secondary base station, for example, notify a network management entity that the secondary base station cannot start tracing the user equipment.

Figure 6:
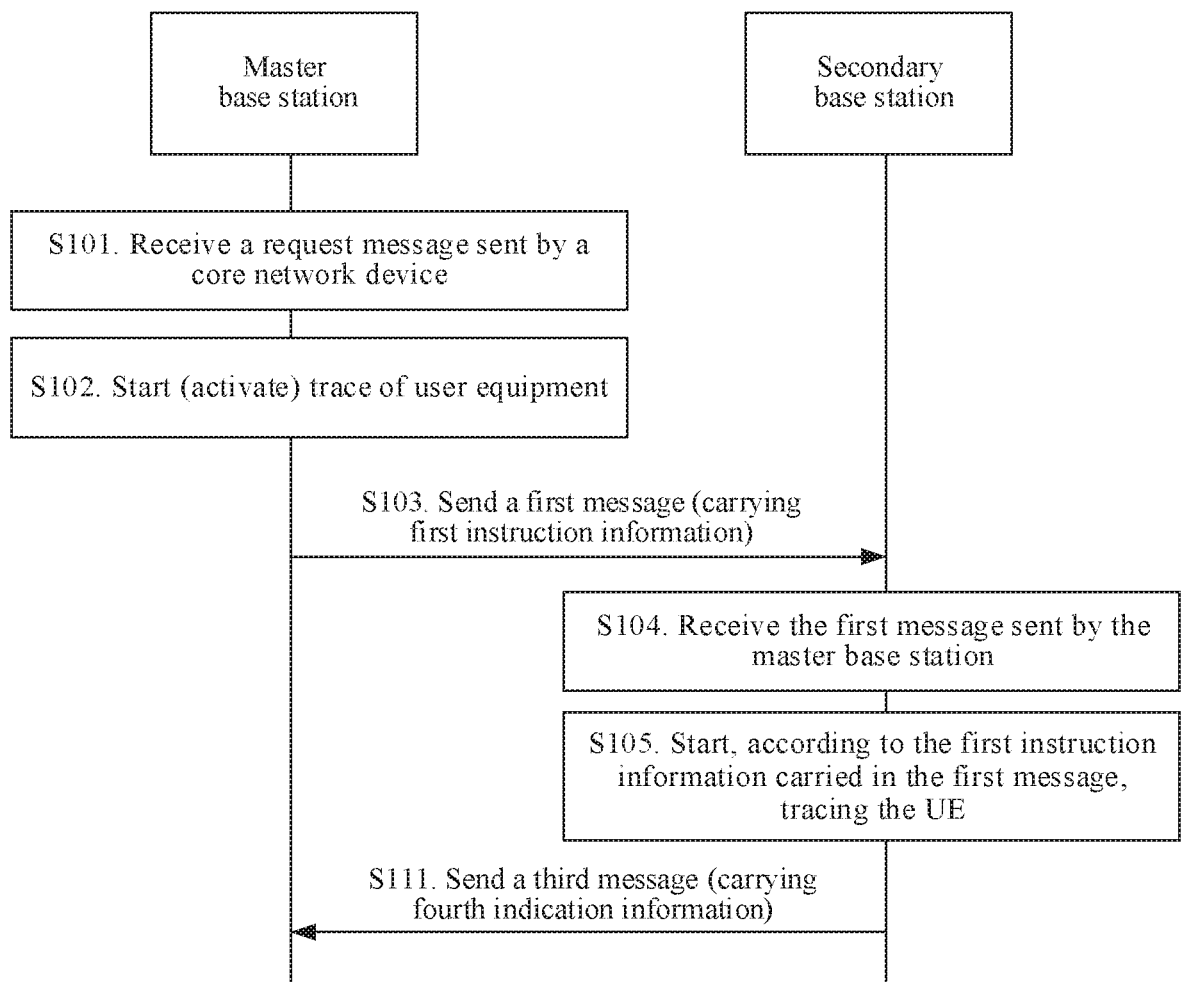
FIG. 6 is a schematic flowchart 4 of a user equipment tracing method according to an embodiment of the present disclosure.

Therefore, in another possible implementation, as shown in FIG. 6, the method provided in this application further includes the following step.

S111. The secondary base station sends a third message to the master base station, where the third message carries third indication information, and the third indication information is used to indicate that the secondary device fails to start tracing the UE.

The third message may be a newly defined message, or may be a secondary base station modification request acknowledgment message.

The third indication information includes at least one of a trace identifier corresponding to the trace start failure and a trace start failure cause. For example, the trace start failure cause may be that the UE changes the secondary base station, and the trace identifier corresponding to the trace start failure is used to identify that a trace task indicated by the trace identifier fails to be started. Certainly, the third indication information may further carry the identifier information of UE corresponding to the trace start failure, to indicate that trace for the UE indicated by the identifier information fails to be started.

After the master base station and the secondary base station obtain trace results for the user equipment, generally, the secondary base station further needs to feed back the trace result to a specified server. In this way, the specified server can perform centralized processing on the trace results fed back by the master base station and the secondary base station.

Therefore, the method provided in this application further includes the following step.

S112. The secondary base station sends the trace result for the user equipment to a target server.

It may be understood that, when the secondary base station performs S112, the secondary base station may learn of an IP address corresponding to the target server, and the IP address corresponding to the target server may be sent by the master base station to the secondary base station (for example, the IP address is carried in the Trace Activation IE and then the Trace Activation IE is sent to the secondary base station). In this way, the secondary base station can feed back the trace result through a southbound interface and an OM channel between the secondary base station and the target server. Similarly, the master base station may also feed back the trace result of the master base station to the target server based on the IP address corresponding to the target server, so that the target server performs, based on a same trace ID from different interfaces or trace IDs in an association relationship, centralized processing on trace data fed back by the master base station and the secondary base station.

Figure 7:
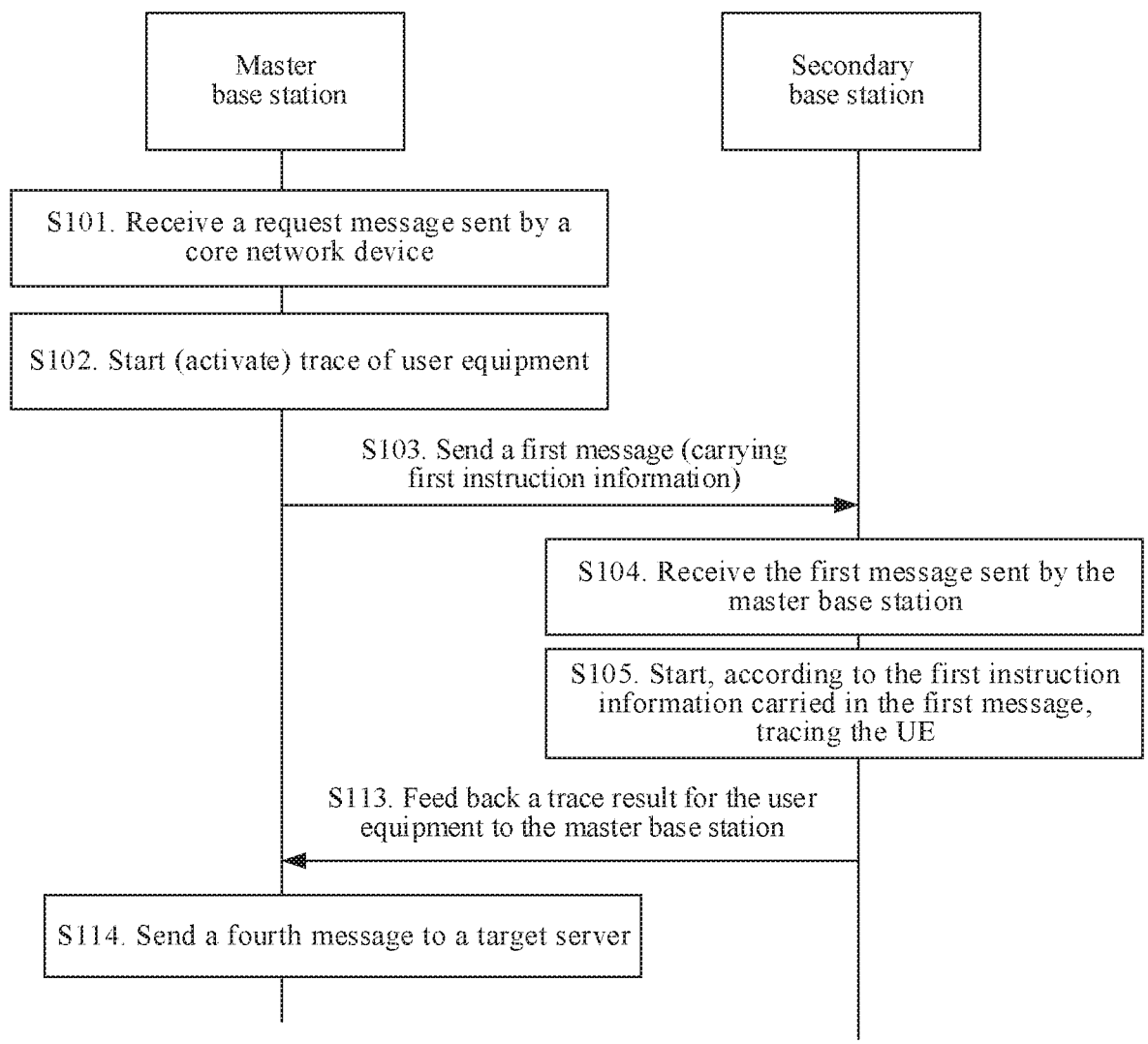
FIG. 7 is a schematic flowchart 5 of a user equipment tracing method according to an embodiment of the present disclosure.

In addition, in an actual process, the master base station may not provide the IP address of the target server for the secondary base station. In this case, after obtaining the trace result for the user equipment, the secondary base station may first feed back the trace result for the user equipment to the master base station, and the master base station sends the trace result to the target server. As shown in FIG. 7, the method provided in this application further includes the following steps.

S113. The secondary base station feeds back the trace result for the user equipment to the master base station.

the secondary base station may feed back the trace result to the master base station by using a control plane bearer or a user plane bearer of the X2/Xn interface.

S114. The master base station sends a fourth message to the target server, where the fourth message includes at least one of the trace result of the secondary base station for the UE and the trace result of the master base station for the UE.

The target server in this embodiment of the present disclosure may be the network entity described in the foregoing embodiment.

It may be understood that, in step S113, the secondary base station may alternatively feed back the trace result for the user equipment to the master base station when the secondary base station has the IP address of the target server. In this way, the secondary base station can flexibly select a device to which the trace result for the user equipment is to be sent.

When the master base station feeds back, to the target server, at least one of the trace result of the secondary base station for the UE and the trace result of the master base station for the UE, to enable the target server to distinguish that a part of a feedback result in content fed back by the master base station is the trace result of the master base station for the user equipment and the other part of the feedback result is the trace result of the secondary base station for the user equipment, the fourth message further needs to carry indication information, to indicate device information corresponding to the trace result for the UE, to be specific, to indicate whether a currently fed back trace result is the trace result of the master base station for the user equipment or the trace result of the secondary base station for the user equipment.

Optionally, the indication information may be any one of an association relationship between the master base station and the trace result of the master base station for the UE, and an association relationship between the secondary base station and the trace result of the secondary base station for the user equipment. The any association relationship is used to instruct the server to determine whether the trace result for the UE is fed back by the master base station or the secondary base station.

the association relationship between the master base station and the trace result of the master base station for the UE may be an association relationship between identifier information of the master base station and the trace result of the master base station for the UE. The association relationship between the secondary base station and the trace result of the secondary base station for the UE may be an association relationship between identifier information of the secondary base station and the trace result of the secondary base station for the UE. The identifier information of the master base station is used to identify the master base station, and the identifier information of the secondary base station is used to identify the secondary base station. Alternatively, each trace result for the UE corresponds to one piece of indication information, and the indication information occupies one bit.

If a value of the bit is set to 0, it indicates that the trace result for the UE is fed back by the master base station; and if the value of the bit is set to 1, it indicates that the trace result for the UE is fed back by the secondary base station. It may be understood that, when each trace result for the UE corresponds to one piece of indication information, the target server pre-stores an association relationship between different indication information and trace results for the UE that are reported by all devices. For example, if the value of the bit is set to 0, it indicates that the trace result for the UE is fed back by the master base station; and if the value of the bit is set to 1, it indicates that the trace result for the UE is fed back by the secondary base station. The association relationship may be determined by the target server and then sent to the master base station, or may be determined by the master base station and then sent to the target server. This is not limited in this application.

It may be understood that the method provided in this application is also applicable to a CU-DU scenario. Therefore, all actions performed by the master base station in FIG. 3 to FIG. 7 may alternatively be performed by a CU, and all actions performed by the secondary base station may alternatively be performed by a DU. In the CU-DU scenario, the CU sends the Trace Activation IE to the DU through the F1 interface, to trigger the DU to trace the UE. Differences between the CU-DU scenario and the scenario including the master base station and the secondary base station lie in that: Signaling exchange between the CU and the DU may be implemented through the F1 interface. In addition, an instruction for instructing the CU to trigger trace for the user equipment may be sent by the master base station to the CU, or may be sent by the core network device to the CU. For a specific process, refer to the foregoing embodiment. Details are not described herein again in this application.

The solutions provided in this application are described above mainly from a perspective of interaction between network elements. It may be understood that to achieve the foregoing functions, the network elements such as the master base station (CU) and the secondary base station (DU) include corresponding hardware structures and/or software modules for performing the functions. A person skilled in the art should easily be aware that, in combination with the examples described in the embodiments disclosed in this specification, units and algorithm steps may be implemented by hardware or a combination of hardware and computer software in the embodiments of the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present disclosure.

In this application, the master base station (CU), the secondary base station (DU), and the like may be divided into function modules based on the foregoing method examples. For example, function modules may be obtained through division corresponding to functions, or two or more functions may be integrated into one processing module. The integrated module may be implemented in a form of hardware, or may be implemented in a form of a software function module. It should be noted that, in this application, division into modules is an example, and is merely logical function division. In an actual implementation, another division manner may be used.

In this application, only the master base station and the secondary base station are used as examples to describe division of the master base station and the secondary base station into logical functions in detail for logical division of the CU and the DU, refer to the master base station and the secondary base station. Details are not described herein in this application.

Figure 8:
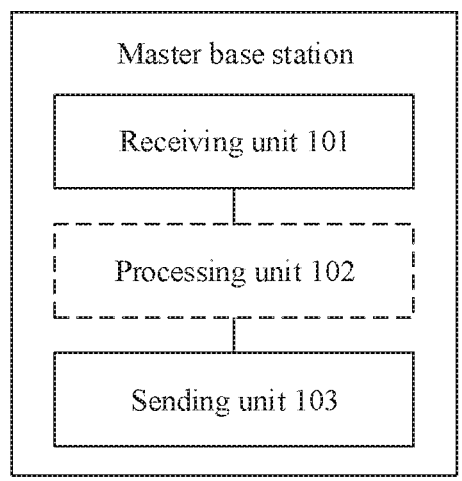
FIG. 8 is a schematic structural diagram 1 of a master base station according to an embodiment of the present disclosure.

When an integrated unit is used, FIG. 8 is a possible schematic structural diagram of the master base station in the foregoing embodiment. The master base station includes a receiving unit 101, a processing unit 102, and a sending unit 103. The receiving unit 101 is configured to support the master base station in performing steps S101 and S107 in the foregoing embodiment. The processing unit 102 is configured to support the master base station in performing step S102 in the foregoing embodiment. The sending unit 103 is configured to support the master base station in performing steps S103, S108, and S114 in the foregoing embodiment. All related content of the steps in the foregoing method embodiment may be cited in function descriptions of the corresponding function modules. Details are not described herein again.

When hardware is used for implementation, in this application, the sending unit 103 may be a transmitter of the master base station, and the receiving unit 101 may be a receiver of the master base station. The transmitter is usually integrated with the receiver of the master base station to serve as a transceiver, the processing unit 102 may be integrated into a processor of the master base station.

Figure 9:
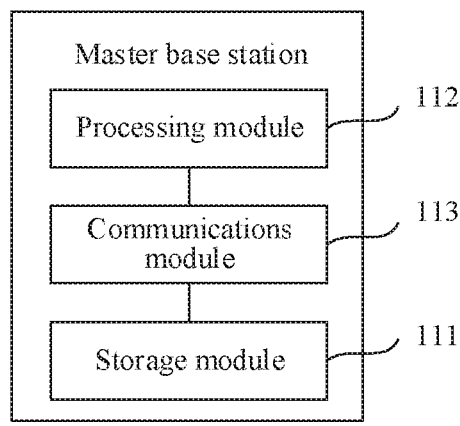
FIG. 9 is a schematic structural diagram 2 of a master base station according to an embodiment of the present disclosure.

When an integrated unit is used, FIG. 9 is a possible schematic diagram of a logical structure of the master base station in the foregoing embodiment. The master base station includes a processing module 112 and a communications module 113. The processing module 112 is configured to control and manage an action of the master base station. For example, the processing module 112 is configured to support the master base station in performing S102 in the foregoing embodiment. The communications module 113 is configured to support the master base station in performing steps S102, S101, S107, S103, and S114 in the foregoing embodiment, and/or another process of the technology described in this specification. The communications module 113 is mainly configured to communicate with a secondary base station and a core network device. The master base station may further include a storage module 111, configured to store program code and data of the master base station.

The processing module 112 may be a processor or controller, for example, may be a central processing unit, a general-purpose processor, a digital signal processor, an application-specific integrated circuit, a field programmable gate array or another programmable logic device, a transistor logic device, a hardware component, or any combination thereof. The processor/controller may implement or execute various examples of logical blocks, modules, and circuits described with reference to content disclosed in the present disclosure. Alternatively, the processor may be a combination of processors implementing a computing function, for example, a combination of one or more microprocessors, or a combination of the digital signal processor and a microprocessor. The communications module 113 may be a transceiver, a transceiver circuit, a communications interface, or the like. The storage module 111 may be a memory.

Figure 10:
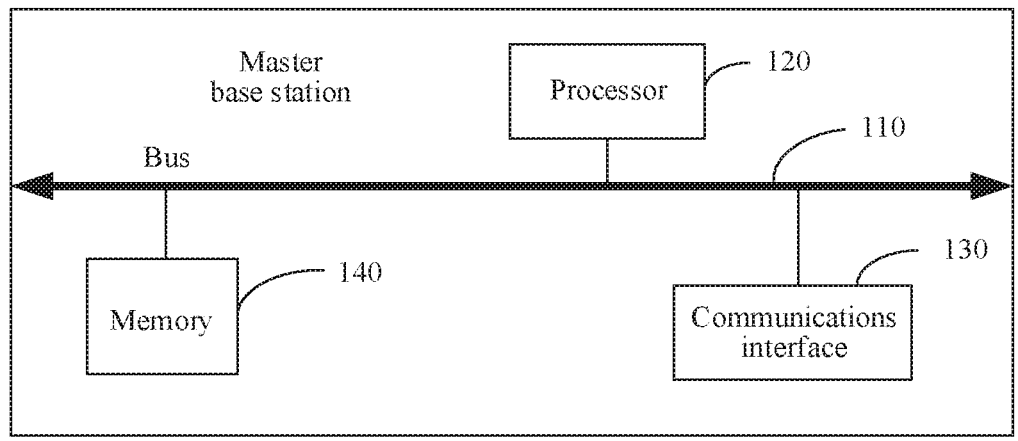
FIG. 10 is a schematic structural diagram 3 of a master base station according to an embodiment of the present disclosure.

When the processing module 112 is a processor 120, the communication module 113 is a communications interface 130 or a transceiver, and the storage module 111 is a memory 140, the master base station in this application may be a device shown in FIG. 10.

The communications interface 130, the processor 120, and the memory 140 are connected to each other through a bus 110. The bus 110 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus. The memory 140 is configured to store program code and data of the master base station. The communications interface 130 is configured to support the master base station in communicating with another device (for example, a secondary base station or a core network device). The processor 120 is configured to support the master base station in executing the program code and the data that are stored in the memory 140, to implement the user equipment tracing method provided in this application.

Figure 11:
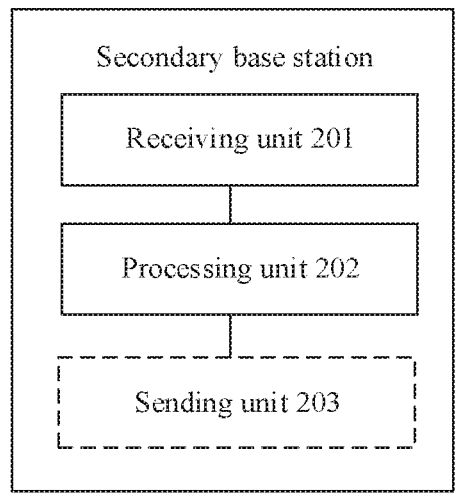
FIG. 11 is a schematic structural diagram 1 of a secondary base station according to an embodiment of the present disclosure.

When an integrated unit is used, FIG. 11 is a possible schematic structural diagram of the secondary base station in the foregoing embodiment. The secondary base station includes a receiving unit 201 and a processing unit 202. The receiving unit 201 is configured to support the secondary base station in performing steps S104 and S109 in the foregoing embodiment. The processing unit 202 is configured to support the secondary base station in performing steps S105 and S110 in the foregoing embodiment. In addition, the secondary base station further includes a sending unit 203.

The sending unit 203 is configured to support the secondary base station in performing steps S106, S111, S112, and S113 in the foregoing embodiment, and/or another process of the technology described in this specification. All related content of the steps in the foregoing method embodiment may be cited in function descriptions of the corresponding function modules. Details are not described herein again.

When hardware is used for implementation, in this application, the receiving unit 201 may be a receiver of the secondary base station, and the sending unit 203 may be a transmitter of the secondary base station. The receiver and the transmitter may be usually integrated together to serve as a transceiver, the receiving unit 201 and the sending unit 203 may be a communications interface of the secondary base station, and the processing unit 202 may be integrated into a processor of the secondary base station.

Figure 12:
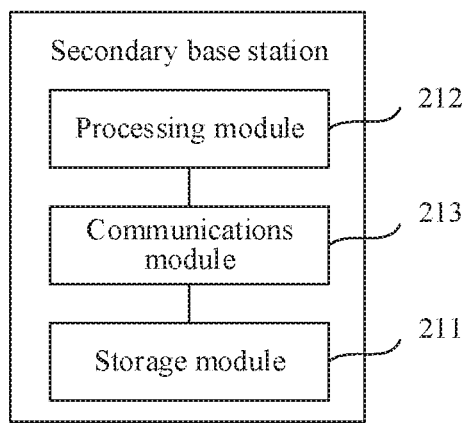
FIG. 12 is a schematic structural diagram 2 of a secondary base station according to an embodiment of the present disclosure.

When an integrated unit is used, FIG. 12 is a possible schematic diagram of a logical structure of the secondary base station in the foregoing embodiment. The secondary base station includes a processing module 212 and a communications module 213. The processing module 212 is configured to control and manage an action of the secondary base station. For example, the processing module 212 is configured to support the secondary base station in performing steps S104 and S110 in the foregoing embodiment. The communications module 213 is configured to support the secondary base station in performing steps S103, S109, S106, S111, S112 and S113 in the foregoing embodiment. The secondary base station may further include a storage module 211, configured to store program code and data of the secondary base station.

The processing module 212 may be a processor or controller, for example, may be a central processing unit, a general-purpose processor, a digital signal processor, an application-specific integrated circuit, a field programmable gate array or another programmable logic device, a transistor logic device, a hardware component, or any combination thereof. The processor/controller may implement or execute various examples of logical blocks, modules, and circuits described with reference to content disclosed in the embodiments of the present disclosure. Alternatively, the processor may be a combination of processors implementing a computing function, for example, a combination of one or more microprocessors, or a combination of the digital signal processor and a microprocessor. The communications module 213 may be a transceiver, a transceiver circuit, a communications interface, or the like. The storage module 211 may be a memory.

Figure 13:
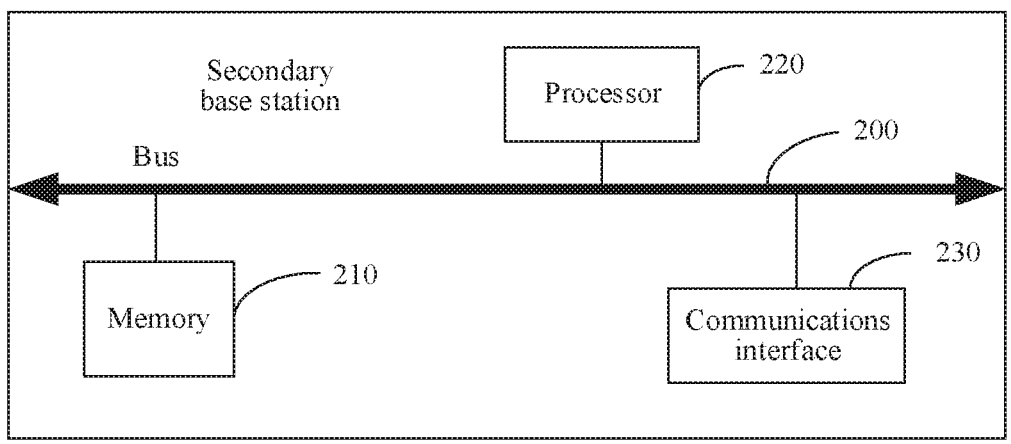
FIG. 13 is a schematic structural diagram 3 of a secondary base station according to an embodiment of the present disclosure.

When the processing module 212 is a processor 220, the communication module 213 is a communications interface 230 or a transceiver, and the storage module 211 is a memory 210, the secondary base station in this application may be a device shown in FIG. 13.

The communications interface 230, the processor 220, and the memory 210 are connected to each other through a bus 200. The bus 200 may be a PCI bus, an EISA bus, or the like. The bus may be classified into an address bus, a data bus, a control bus, and the like. For ease of representation, only one thick line is used to represent the bus in FIG. 13, but this does not mean that there is only one bus or only one type of bus. The memory 210 is configured to store program code and data of the secondary base station. The communications interface 230 is configured to support the secondary base station in communicating with another device (for example, a master base station). The processor 220 is configured to support the secondary base station in executing the program code and the data that are stored in the memory 210, to implement the user equipment tracing method provided in this application.

In another embodiment of the present disclosure, a computer-readable storage medium is further provided. The computer-readable storage medium stores a computer-executable instruction. When at least one processor of a master base station (CU) executes the computer-executable instruction, the master base station (CU) performs S101, S102, S103, S107, S108, and S114 in the foregoing embodiment, or another step performed by the master base station (CU) in the foregoing embodiment.

In another embodiment of the present disclosure, a computer-readable storage medium is further provided. The computer-readable storage medium stores a computer-executable instruction. When at least one processor of a secondary base station (DU) executes the computer-executable instruction, the secondary base station (DU) performs S105, S110, S104, S109, S106, S111, S112, and S113 in the foregoing embodiment, or another step performed by the secondary base station (DU) in the foregoing embodiment.

In another embodiment of the present disclosure, a computer program product is further provided. The computer program product includes a computer-executable instruction. The computer-executable instruction is stored in a computer-readable storage medium. At least one processor of a master base station (CU) may read the computer-executable instruction from the computer-readable storage medium, and the at least one processor of the master base station (CU) executes the computer-executable instruction, to enable the master base station (CU) to perform steps S101, S102, S103, S107, S108, and S114, or another step performed by the master base station (CU) in the foregoing embodiment.

In another embodiment of the present disclosure, a computer program product is further provided. The computer program product includes a computer-executable instruction. The computer-executable instruction is stored in a computer-readable storage medium. At least one processor of a secondary base station (DU) may read the computer-executable instruction from the computer-readable storage medium, and the at least one processor of the secondary base station (DU) executes the computer-executable instruction, to enable the secondary base station (DU) to perform steps S105, S110, S104, S109, S106, S111, S112, and S113, and another step performed by the secondary base station (DU) in the foregoing embodiment.

In another embodiment of the present disclosure, a communications system is further provided. The communications system may be applicable to the architecture shown in FIG. 1. A master base station uses the structures shown in FIG. 8, FIG. 9, and FIG. 10, and a secondary base station uses the structures shown in FIG. 11, FIG. 12, and FIG. 13. In another embodiment of the present disclosure, a communications system is further provided. The communications system may be applicable to the architecture shown in FIG. 2. A CU uses the structures shown in FIG. 8, FIG. 9, and FIG. 10, and a DU uses the structures shown in FIG. 11, FIG. 13, and FIG. 12.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A base station comprising a centralized unit and a distributed unit,
  wherein the centralized unit comprises:
    at least one processor; and
    one or more memories storing programming instructions executable by the at least one processor to perform one or more first operations comprising:
      receiving, by the centralized unit of the base station, a request message from a core network device, wherein the request message requests the centralized unit of the base station to initiate trace for user equipment (UE); and
      sending, by the centralized unit of the base station, a first message to the distributed unit of the base station through an F1 interface, wherein the first message carries first instruction information, the first instruction information instructs the distributed unit of the base station to trace the UE, and the first instruction information comprises an interface-to-trace indication, the interface-to-trace indication instructing the distributed unit of the base station to trace the UE on the F1 interface;
  wherein the distributed unit comprises:
    at least one processor; and
    one or more memories storing programming instructions executable by the at least one processor to perform second one or more second operations comprising:
      tracing, by the distributed unit of the base station, the UE according to the first instruction information.

2. The base station according to claim 1, wherein the first instruction information further comprises at least one of:
  a trace identifier;
  a trace depth indication;
  a trace collection entity IP address; or
  configuration information for minimization of drive tests.

3. The base station according to claim 2, wherein the interface-to-trace indication further instructs the distributed unit of the base station to trace the UE on a Uu interface.

4. The base station according to claim 1, the one or more first operations further comprising:
  sending, by the centralized unit of the base station, a second message to the distributed unit of the base station, wherein the second message carries second instruction information, and the second instruction information comprises a trace deactivation instruction that instructs the distributed unit to deactivate the trace for the UE; and the one or more second operations further comprising:
deactivating the trace for the UE.

5. The base station according to claim 4, wherein the second instruction information comprises at least one of a trace identifier corresponding to the trace deactivation instruction or a deactivation cause.

6. The base station according to claim 1, the one or more first operations further comprising:
receiving, by the centralized unit of the base station, a third message from the distributed unit of the base station, wherein the third message carries third indication information, and the third indication information indicates a trace start failure that the distributed unit of the base station fails to start tracing the UE.

7. The base station according to claim 6, wherein the third indication information comprises:
at least one of a trace identifier corresponding to the trace start failure or a trace start failure cause.

8. The base station according to claim 1, the one or more first operations further comprising:
receiving, by the centralized unit of the base station, a trace result for the UE that is from the distributed unit; and
sending, by the centralized unit of the base station, a fourth message to a target server, wherein the fourth message comprises at least one of the trace result of the distributed unit of the base station for the UE or a trace result of the centralized unit of the base station for the UE.

9. A user equipment tracing method, comprising:
receiving, by a distributed unit of a base station through an F1 interface, a first message from a centralized unit of the base station, wherein the first message carries first instruction information, and the first instruction information instructs the distributed unit to trace a user equipment (UE), wherein the first instruction information comprises an interface-to-trace indication, and the interface-to-trace indication instructs the distributed unit of the base station to trace the UE on the F1 interface; and
tracing, by the distributed unit of the base station, the UE according to the first instruction information.

10. The user equipment tracing method according to claim 9, wherein the first instruction information further comprises at least one of:
a trace identifier;
a trace depth indication;
a trace collection entity IP address; or
configuration information for minimization of drive tests.

11. The user equipment tracing method according to claim 10, wherein the interface-to-trace indication further instructs the distributed unit of the base station to trace the UE on a Uu interface.

12. The user equipment tracing method according to claim 11, further comprising:
receiving, by the distributed unit of the base station, a second message from the centralized unit of the base station, wherein the second message carries second instruction information, and the second instruction information comprises a trace deactivation instruction that instructs the distributed unit of the base station to deactivate the trace for the UE.

13. The user equipment tracing method according to claim 9, further comprising:

sending, by the distributed unit of the base station, a third message to the centralized unit of the base station, wherein the third message carries third indication information, and the third indication information indicates a trace start failure that the distributed unit of the base station fails to start tracing the UE.

14. The user equipment tracing method according to claim 9, further comprising:
sending, by the distributed unit of the base station, a trace result for the UE to the centralized unit of the base station.

15. A device of a base station, comprising:
at least one processor; and
an interface circuitry;
wherein the at least one processor and the interface circuitry are coupled with each other; wherein the at least one processor executes program instructions to cause the device to perform operations comprising:
receiving a request message from a core network device, wherein the request message requests the device to initiate trace for user equipment (UE); and
sending a first message to a distributed unit of the base station through an F1 interface, wherein the first message carries first instruction information, the first instruction information instructs the distributed unit of the base station to trace the UE, the first instruction information comprises an interface-to-trace indication, and the interface-to-trace indication instructs the distributed unit of the base station to trace the UE on the F1 interface.

16. The device according to claim 15, wherein the first instruction information further comprises at least one of:
a trace identifier;
a trace depth indication;
a trace collection entity IP address; or
configuration information for minimization of drive tests.

17. The device according to claim 16, wherein the interface-to-trace indication further instructs the distributed unit of the base station to trace the UE on a Uu interface.

18. The device according to claim 15, wherein the at least one processor executes program instructions to cause the device to further perform:
sending a second message to the distributed unit of the base station, wherein the second message carries second instruction information, and the second instruction information comprises a trace deactivation instruction that instructs the distributed unit of the base station to deactivate the trace for the UE.

19. The device according to claim 18, wherein the second instruction information comprises at least one of a trace identifier corresponding to the trace deactivation instruction or a deactivation cause.

20. The device according to claim 15, wherein the at least one processor executes program instructions to cause the device to further perform:
receiving a third message from the distributed unit of the base station, wherein the third message carries third indication information, and the third indication information indicates a trace start failure that the distributed unit of the base station fails to start tracing the UE.

21. The device according to claim 20, wherein the third indication information comprises at least one of a trace identifier corresponding to the trace start failure or a trace start failure cause.

22. The device according to claim 15, wherein the at least one processor executes program instructions to cause the device to further perform operations comprising:

receiving a trace result for the UE that is from the distributed unit of the base station; and sending a fourth message to a target server, wherein the fourth message comprises at least one of the trace result of the distributed unit of the base station for the UE or a trace result of the device for the UE.

23. A device of a base station, comprising:

at least one processor; and an interface circuitry;

wherein the at least one processor and the interface circuitry are coupled with each other; wherein the at least one processor executes program instructions to cause the device to perform operations comprising:

receiving a first message from a centralized unit of the base station through an F1 interface, wherein the first message carries first instruction information, and the first instruction information instructs the device to trace user equipment (UE), wherein the first instruction information comprises an interface-to-trace indication, and the interface-to-trace indication instructs the device of the base station to trace the UE on the F1 interface; and tracing the UE according to the first instruction information.

24. The device according to claim 23, wherein the first instruction information further comprises at least one of:

a trace identifier;

a trace depth indication;

a trace collection entity IP address; or configuration information for minimization of drive tests.

25. The device according to claim 24, wherein the interface-to-trace indication further instructs the device of the base station to trace the UE on a Uu interface.

26. The device according to claim 23, wherein the at least one processor executes program instructions to cause the device to further perform operations comprising:

receiving a second message from the centralized unit of the base station, wherein the second message carries second instruction information, and the second instruction information comprises a trace deactivation instruction that instructs the device to deactivate the tracing the UE.

27. The device according to claim 26, wherein the second instruction information comprises at least one of:

at least one of a trace identifier corresponding to the trace deactivation instruction or a deactivation cause.

28. The device according to claim 23, wherein the at least one processor executes program instructions to cause the device to further perform operations comprising:

sending a third message to the centralized unit of the base station, wherein the third message carries third indication information, and the third indication information indicates a trace start failure that the device fails to start tracing the UE.

29. The device according to claim 28, wherein the third indication information comprises at least one of a trace identifier corresponding to the trace start failure or a trace start failure cause.

30. The device according to claim 23, wherein the at least one processor executes program instructions to cause the device to further perform operations comprising:

sending a trace result for the UE to the centralized unit of the base station.

31. The base station according to claim 1, wherein functions of a packet data convergence protocol (PDCP) layer and a radio resource control (RRC) layer located above the PDCP layer are set on the centralized unit of the base station; and functions of a radio link control (RLC) layer, a media access control (MAC) layer, and a physical layer (PHY) are set on the distributed unit of the base station.

32. The user equipment tracing method according to claim 9, wherein functions of a packet data convergence protocol (PDCP) layer and a radio resource control (RRC) layer located above the PDCP layer are set on the centralized unit of the base station; and functions of a radio link control (RLC) layer, a media access control (MAC) layer, and a physical layer (PHY) are set on the distributed unit of the base station.

33. The base station according to claim 1, wherein the one or more first operations comprise:

starting, by the centralized unit of the base station, tracing the UE according to the request message.

34. The device according to claim 15, wherein the operations comprise:

starting tracing the UE according to the request message.

* * * * *